(12) United States Patent
Hori

(10) Patent No.: US 11,652,934 B2
(45) Date of Patent: May 16, 2023

(54) PRINTING DEVICE

(71) Applicant: SEIKO EPSON CORPORATION, Tokyo (JP)

(72) Inventor: Yasushige Hori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/652,284

(22) Filed: Feb. 24, 2022

(65) Prior Publication Data

US 2022/0279082 A1    Sep. 1, 2022

(30) Foreign Application Priority Data

Feb. 26, 2021    (JP) .............................. JP2021-030430

(51) Int. Cl.
| | | |
|---|---|---|
| *G06F 3/041* | (2006.01) | |
| *H04N 1/00* | (2006.01) | |
| *G06F 3/044* | (2006.01) | |
| *G06F 3/16* | (2006.01) | |

(52) U.S. Cl.
CPC ......... *H04N 1/00488* (2013.01); *G06F 3/044* (2013.01); *G06F 3/167* (2013.01); *H04N 1/00411* (2013.01)

(58) Field of Classification Search
CPC ........... H04N 1/00411; H04N 1/00488; G06F 1/601; G06F 3/041; G06F 3/044; G06F 3/1201; G06F 3/167; B41J 29/393
USPC ....................................................... 358/1.15
See application file for complete search history.

(56) References Cited

U.S. PATENT DOCUMENTS

| | | | |
|---|---|---|---|
| 9,793,958 B2* | 10/2017 | Funakawa | ............ H04B 5/0093 |
| 11,531,368 B2* | 12/2022 | Fukumoto | ............ G06K 15/005 |
| 2016/0224289 A1* | 8/2016 | Yamanaka | ......... H04N 1/00408 |
| 2017/0026530 A1 | 1/2017 | Sawada | |
| 2017/0310836 A1 | 10/2017 | Nakayama et al. | |
| 2017/0374213 A1 | 12/2017 | Sawada | |
| 2019/0037089 A1 | 1/2019 | Nakayama et al. | |
| 2019/0335046 A1 | 10/2019 | Nakayama et al. | |
| 2020/0288026 A1 | 9/2020 | Nakayama et al. | |

FOREIGN PATENT DOCUMENTS

| | | | |
|---|---|---|---|
| JP | 2017-196747 A | 11/2017 | |
| JP | 2020-077010 A | 5/2020 | |

\* cited by examiner

*Primary Examiner* — Kent Yip
(74) *Attorney, Agent, or Firm* — Global IP Counselors, LLP

(57) ABSTRACT

A printing device includes a printing unit and a panel unit. The printing unit includes a printing mechanism that executes a printing operation, a main circuit board including a processor that controls an operation of a panel unit and an operation of the printing mechanism, and a relay board that relays a signal propagated between the main circuit board and the panel unit, the panel unit is rotatably attached to the printing unit so as to take a first attachment state and a second attachment state, the relay board includes a wireless communication device attachment portion to which a wireless communication device configured to receive a wireless signal from an outside by wireless communication is attached, and a shortest distance between the panel unit and the relay board is smaller than a shortest distance between the panel unit and the main circuit board.

10 Claims, 10 Drawing Sheets

PRINTING DEVICE

The present application is based on, and claims priority from JP Application Serial Number 2021-030430, filed Feb. 26, 2021, the disclosure of which is hereby incorporated by reference herein in its entirety.

BACKGROUND

1. Technical Field

The present disclosure relates to a printing device.

2. Related Art

In recent years, there has been an increasing demand for printing devices having a large touch panel from the viewpoint of displaying easy-to-understand information to a user and preventing malfunctions of a user. As examples of such a printing device having a large touch panel, there is known a printing device capable of improving the operability of a user by tilting a large touch panel, such as a printing device having a large touch panel and a receiver for short-range wireless communication or the like integrally as described in JP-A-2020-077010 and a printing device having a large touch panel and a receiver for short-range wireless communication or the like integrally as described in JP-A-2017-196747.

However, since the printing device described in JP-A-2020-077010 and JP-A-2017-196747 is provided with a large touch panel, the occupied area of the touch panel in the printing device becomes large, and as a result, a discharge tray to which the printed medium is discharged overlaps a part of the touch panel, which may impair the convenience of the user. That is, in a printing device having a large touch panel as described in JP-A-2020-077010 and JP-A-2017-196747, since it is provided with a large touch panel, there is a possibility of a new problem.

In particular, in a printing device having a large touch panel and additional functions such as short-range wireless communication integrally as described in JP-A-2020-077010 and JP-A-2017-196747, depending on the disposition of the large touch panel and the additional function, the large touch panel and the additional function may interfere with each other, which may further impair the convenience of the user, and the printing device may malfunction due to the influence of noise caused by signal interference or the like. That is, in a printing device having a large touch panel and additional functions such as short-range wireless communication integrally as described in JP-A-2020-077010 and JP-A-2017-196747, there is a possibility that a problem due to the large touch panel provided in the printing device may occur more prominently.

SUMMARY

According to an aspect of the present disclosure, there is provided a printing device including a printing unit that performs printing on a medium, and a panel unit to which operation information for operating the printing unit is input, in which the printing unit includes a printing mechanism that executes a printing operation according to the operation information, a main circuit board including a processor that controls an operation of the panel unit and controls an operation of the printing mechanism based on the operation information, and a relay board that relays a signal propagated between the main circuit board and the panel unit, the panel unit includes a display panel, a touch sensor in which a position detection sensor and a cover glass are laminated, and a panel circuit board electrically coupled to the touch sensor, the touch sensor includes a first side, a second side located facing the first side, a third side intersecting both the first side and the second side, and a fourth side located facing the third side, the panel unit is rotatably attached to the printing unit so as to take a first attachment state and a second attachment state, in the first attachment state, an angle formed by a horizontal direction and a normal direction of the touch sensor is larger than an angle formed by a vertical direction and the normal direction of the touch sensor, in the second attachment state, the angle formed by the horizontal direction and the normal direction of the touch sensor is smaller than the angle formed by the vertical direction and the normal direction of the touch sensor, when the panel unit is in the second attachment state, the touch sensor is disposed such that the first side is lower than the second side in a direction along the vertical direction, the relay board includes a wireless communication device attachment portion to which a wireless communication device configured to receive a wireless signal from an outside by wireless communication is attached, and a shortest distance between the panel unit and the relay board is smaller than a shortest distance between the panel unit and the main circuit board.

DESCRIPTION OF EXEMPLARY EMBODIMENTS

Hereinafter, preferred embodiments of the present disclosure will be described with reference to the drawings. The drawings used are for convenience of description. The embodiments to be described below do not unduly limit the contents of the present disclosure described in the scope of claims. In addition, all of the configurations to be described below are not necessarily essential configuration requirements of the present disclosure.

Hereinafter, as the printing device according to the present disclosure, an ink jet printer that prints an image by ejecting a liquid onto a medium will be described as an example, but the printing device is not limited to the ink jet printer, and may be a dot impact printer, a thermal transfer printer, a laser printer, or the like.

1. Functional Configuration of Printing Device

Figure 1:
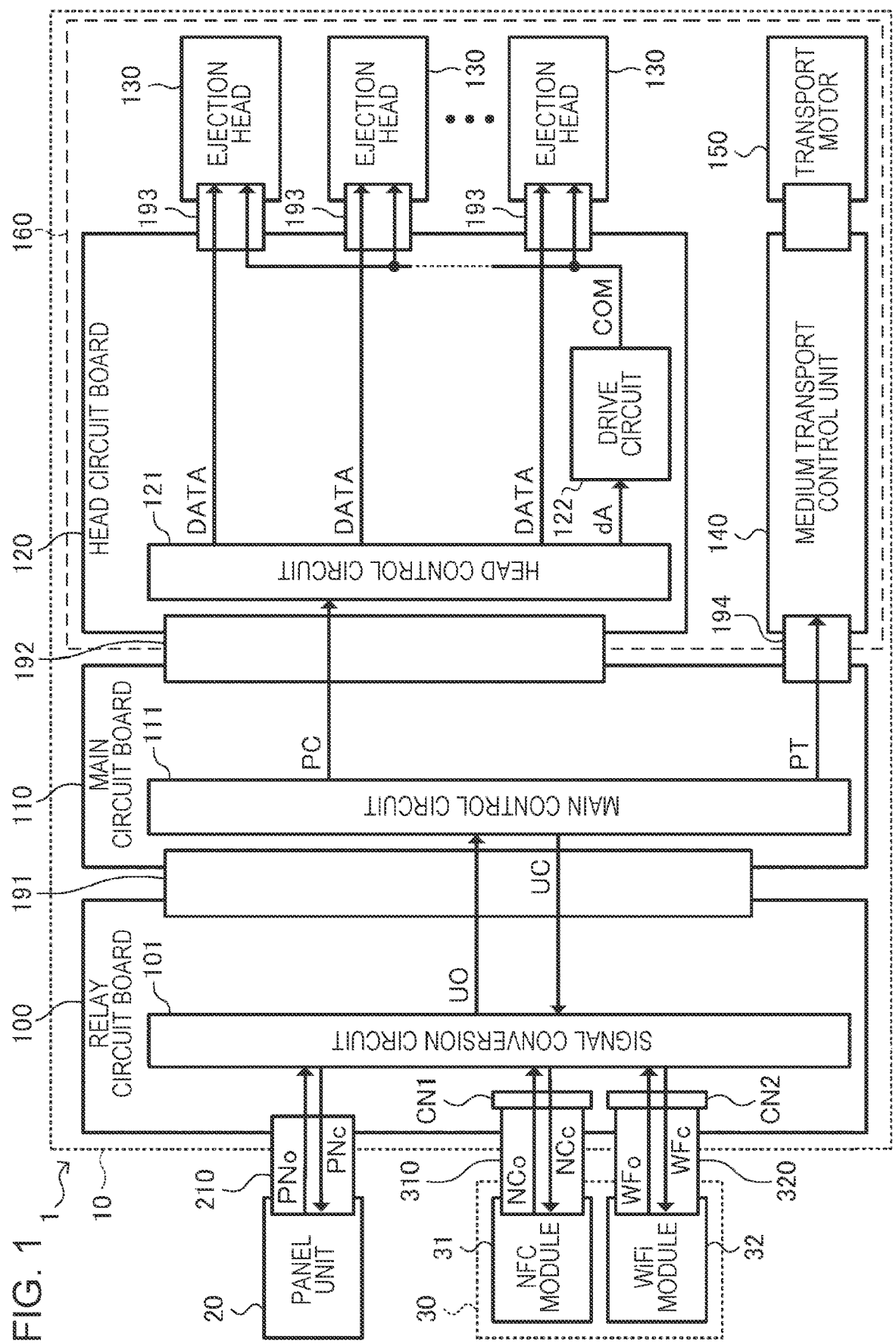
FIG. 1 is a diagram for describing a functional configuration of a printing device.

FIG. 1 is a diagram for describing a functional configuration of a printing device 1. As shown in FIG. 1, the printing device 1 includes a printing unit 10, a panel unit 20, and a wireless communication unit 30. Then, the printing device 1 prints a desired image on a medium by causing the printing unit 10 to land ink at a predetermined position on the medium based on information input from the panel unit 20 and the wireless communication unit 30. That is, the printing device 1 includes a printing unit 10 that performs printing on a medium, and a panel unit 20 to which operation information for operating the printing unit 10 is input.

Here, although the medium to be printed by the printing device 1 in the present embodiment will be described as sheet-fed paper, the medium used in the printing device is not limited to sheet-fed paper, and may be roll paper. Further, the medium is not limited to paper, and may be a fiber material such as a cloth or a resin such as plastic.

Operation information for operating the printing device 1 is input to the panel unit 20 by an operation of a user, and an operating state of the printing device 1 is displayed thereon. Specifically, the operation of the panel unit 20 is controlled by a panel control signal PNc input from the printing unit 10 via a cable 210, and the operating state of the printing device 1 propagated based on the panel control signal PNc is displayed thereon. Further, the panel unit 20 outputs the operation information input by the user as a panel operation signal PNo to the printing unit 10 via the cable 210. Here, the panel control signal PNc input to the panel unit 20 and the panel operation signal PNo output by the panel unit 20 may be, for example, a signal conforming to I squared C (I2C) communication propagated by serial data and a serial clock, or a differential signal such as low voltage differential signaling (LVDS) communication. The details of the functional configuration of the panel unit 20 and the details of the structure will be described later.

The wireless communication unit 30 is a wireless communication device capable of receiving a wireless signal from the outside by wireless communication, and includes a near field communication (NFC) module 31 that performs wireless communication at a short distance of several cm to several tens of cm, and a WiFi module 32 capable of performing long-range and high-speed wireless communication as compared with the NFC module 31.

The operation of the NFC module 31 is controlled based on an NFC control signal NCc input from the printing unit 10 via a connector CN1 and a cable 310 coupled to the connector CN1, and information input to the NFC module 31 as a wireless signal is output to the printing unit 10 via the connector CN1 and the cable 310 as an NFC reception signal NCo. Such an NFC module 31 that performs wireless communication at a short distance of several cm to several tens of cm is used, for example, for an authentication function or the like for correlating a user who executed the printing operation with the medium on which the printing operation is executed when the printing device 1 is shared by a plurality of users.

The operation of the WiFi module 32 capable of performing long-range and high-speed wireless communication is controlled based on a WiFi control signal WFc input from the printing unit 10 via a connector CN2 and a cable 320 coupled to the connector CN2, and information input to the WiFi module 32 as a wireless signal is output to the printing unit 10 via the connector CN2 and the cable 320 as a WiFi reception signal WFo. Such a WiFi module 32 capable of performing long-range and high-speed wireless communication also functions as an interface circuit that connects the printing device 1 with an external device such as a personal computer that outputs image information to be printed on the medium by the printing device 1 by a wireless signal.

Here, the NFC module 31 and the WiFi module 32 may be detachable from the printing device 1 by being communicably connected via, for example, a universal serial bus (USB) terminal or the like. That is, the printing device 1 includes connectors CN1 and CN2 to which the NFC module 31 and the WiFi module 32 can be attached, and communication with the printing unit 10 is realized by coupling the NFC module 31 and the WiFi module 32 to the connectors CN1 and CN2.

The printing unit 10 includes a relay circuit board 100, a main circuit board 110, a head circuit board 120, a plurality of ejection heads 130, a medium transport control unit 140, and a transport motor 150.

The main circuit board 110 includes a main control circuit 111 that outputs a control signal for controlling each portion of the printing device 1. The main control circuit 111 includes a system on a chip (SoC) including a central processing unit (CPU).

The main control circuit 111 outputs a unit control signal UC for controlling the operation of the panel unit 20 and the wireless communication unit 30. The unit control signal UC is input to a signal conversion circuit 101 in the relay circuit board 100 via a cable 191. The signal conversion circuit 101 generates a panel control signal PNc that controls the panel unit 20 based on the unit control signal UC input from the main control circuit 111. Then, the signal conversion circuit 101 outputs the panel control signal PNc to the panel unit 20 via the cable 210. Further, the signal conversion circuit 101 generates an NFC control signal NCc that controls the NFC module 31 based on the unit control signal UC input from the main control circuit 111. Then, the signal conversion circuit 101 outputs the NFC control signal NCc to the NFC module 31 via the connector CN1 provided on the relay circuit board 100 and the cable 310. Further, the signal conversion circuit 101 generates a WiFi control signal WFc that controls the WiFi module 32 based on the unit control signal UC input from the main control circuit 111. Then, the signal conversion circuit 101 outputs the WiFi control signal WFc to the WiFi module 32 via the connector CN2 provided on the relay circuit board 100 and the cable 320.

Further, the panel operation signal PNo output by the panel unit 20, the NFC reception signal NCo output by the NFC module 31, and the WiFi reception signal WFo output by the WiFi module 32 are input to the signal conversion circuit 101. Then, the signal conversion circuit 101 generates a unit output signal UO based on the input panel operation signal PNo, NFC reception signal NCo, and WiFi reception signal WFo, and outputs the unit output signal UO to the main control circuit 111.

Here, the signal conversion circuit 101 may be configured as one integrated circuit device, or may be configured as a plurality of integrated circuit devices corresponding to each of the panel unit 20, the NFC module 31, and the WiFi module 32. Further, the unit control signal UC and the unit output signal UO propagating between the signal conversion circuit 101 and the main control circuit 111 may be a plurality of signals corresponding to each of the panel unit 20, the NFC module 31, and the WiFi module 32. That is, the main control circuit 111 may output a plurality of signals corresponding to each of the panel control signal PNc, the NFC control signal NCc, and the WiFi control signal WFc as the unit control signal UC to the signal conversion circuit 101, and the signal conversion circuit 101 may output a plurality of signals corresponding to each of the panel operation signal PNo, the NFC reception signal NCo, and the WiFi reception signal WFo as the unit output signal UO to the main control circuit 111. Such a relay circuit board 100 relays signals propagated between the main circuit board 110 and the panel unit 20, the NFC module 31, and the WiFi module 32.

Further, the main control circuit 111 transports the medium on which the printing operation is executed based on the unit output signal UO input from the signal conversion circuit 101. Specifically, the main control circuit 111 generates a transport control signal PT for transporting the medium on which the printing operation is executed, and outputs the transport control signal PT to the medium transport control unit 140 via a cable 194. The medium transport control unit 140 generates a drive control signal for controlling the drive of the transport motor 150 based on the input transport control signal PT, and outputs the drive control signal to the transport motor 150. Thereby, the transport motor 150 is driven, and the medium is transported along a predetermined transport direction as the transport motor 150 is driven.

Further, the main control circuit 111 generates a print control signal PC for performing printing on the medium based on the unit output signal UO input from the signal conversion circuit 101, and outputs the print control signal PC to the head circuit board 120 via the cable 192.

The print control signal PC is input to a head control circuit 121 in the head circuit board 120. The head control circuit 121 generates a print data signal DATA corresponding to each of the plurality of ejection heads 130 having a plurality of nozzles for ejecting ink to the medium based on the input print control signal PC, and supplies the print data signal DATA to the corresponding ejection head 130. Further, the head control circuit 121 generates a basic drive signal dA which is a basis of a drive signal COM based on the print control signal PC input from the signal conversion circuit 101, and outputs the basic drive signal dA to the drive circuit 122. Then, the drive circuit 122 generates a drive signal COM having a waveform defined by the basic drive signal dA supplied from the head control circuit 121, and outputs the drive signal COM to the plurality of ejection heads 130.

Each of the plurality of ejection heads 130 includes a plurality of nozzles for ejecting ink to the medium, and a plurality of drive elements that correspond to each of the plurality of nozzles and drive the ink to be ejected from the corresponding nozzles by being supplied with the drive signal COM. Each of the plurality of ejection heads 130 is electrically coupled to the head circuit board 120 via a cable 193. Each of the ejection heads 130 supplies the drive signal COM to the drive element corresponding to the nozzle that ejects ink to the medium among the plurality of nozzles and does not supply the drive signal COM to the drive element corresponding to the nozzle that does not eject ink to the medium among the plurality of nozzles by switching whether or not to supply the drive signal COM supplied from the drive circuit 122 to each of the plurality of drive elements based on the print data signal DATA supplied from the head control circuit 121. Thereby, ink is ejected only from the nozzle corresponding to the drive element to which the drive signal COM is supplied, and ink is not ejected from the nozzle corresponding to the drive element to which the drive signal COM is not supplied. That is, the plurality of ejection heads 130 eject ink at timings defined by the print data signal DATA and from the nozzles designated by the print data signal DATA by switching whether or not to supply the drive signal COM to each of the plurality of drive elements based on the print data signal DATA output by the head control circuit 121.

As described above, in the printing device 1 according to the present embodiment, the main control circuit 111 controls the transport of the medium via the medium transport control unit 140, and also controls the operation of the head control circuit 121 in the head circuit board 120 based on the operation information input from the panel unit 20 and the wireless communication unit 30. Thereby, a nozzle that ejects ink to the medium and a nozzle that does not eject ink are selected. That is, the main control circuit 111 controls both the transport of the medium and the ejection timing of the ink. Thereby, the ejection head 130 can land the ink at a desired position on the medium. That is, dots are formed at a desired position on the medium. Thereby, the printing device 1 prints a desired image on the medium.

Here, in the following description, a configuration including the head circuit board 120, the plurality of ejection heads 130, the medium transport control unit 140, and the transport motor 150, which execute printing operations on the medium under the control of the main circuit board 110, may be collectively referred to as a printing mechanism 160. That is, the printing unit 10 includes the printing mechanism 160 that executes a printing operation of printing an image on a medium according to the operation information input by a user operating the panel unit 20 or the wireless communication unit 30, the main circuit board 110 including the main control circuit 111 that outputs the unit control signal UC for controlling the operation of the panel unit 20 and the wireless communication unit 30 and that controls the operation of the printing mechanism 160 according to the unit output signal UO based on the panel operation signal PNo, the NFC reception signal NCo, and the WiFi reception signal WFo output by the panel unit 20 and the wireless communication unit 30, and the relay circuit board 100 that relays signals propagated between the main circuit board 110 and the panel unit 20, the NFC module 31, and the WiFi module 32. Further, the relay circuit board 100 includes a detachable NFC module 31 and connectors CN1 and CN2 to which the WiFi module 32 is attached.

The printing device 1 may have a USB port, a local area network (LAN) port, or the like for connecting the printing device 1 and an external device by a LAN cable or a USB cable, and further, the printing device 1 may be able to read image information stored in a storage medium such as a hard disk or a flash memory connected to the USB port, the LAN port, or the like by the operation of the panel unit 20 by the user, and to execute a printing operation based on the read information. Further, the printing device 1 may include a scanner unit that acquires image information formed on the medium. That is, the printing device 1 may be a so-called multifunction device capable of forming an image on a medium and acquiring the image formed on the medium.

Here, the main control circuit 111 in the main circuit board 110 is an example of a processor, and the relay circuit board 100 is an example of a relay board. Further, the NFC module 31 and the WiFi module 32 included in the wireless communication unit 30 are examples of wireless communication devices, the NFC module 31 among the examples of wireless communication devices is an example of a first wireless communication device, and the WiFi module 32 among the examples of wireless communication devices is an example of a second wireless communication device. The connectors CN1 and CN2 in the relay circuit board 100 to which the NFC module 31 and the WiFi module 32 are coupled are examples of wireless communication device attachment portions, the connector CN1 among the examples of the wireless communication device attachment portions is an example of a first wireless communication device attachment portion, and the connector CN2 among the examples of the wireless communication device attachment portions is an example of a second wireless communication device attachment portion. The wireless communication unit 30 may include various wireless communication devices such as Bluetooth (registered trademark) in place of or in addition to the NFC module 31 and the WiFi module 32. That is, various wireless communication devices other than the NFC module 31 and the WiFi module 32 are included in the wireless communication device.

2. Functional Configuration of Panel Unit

Figure 2:
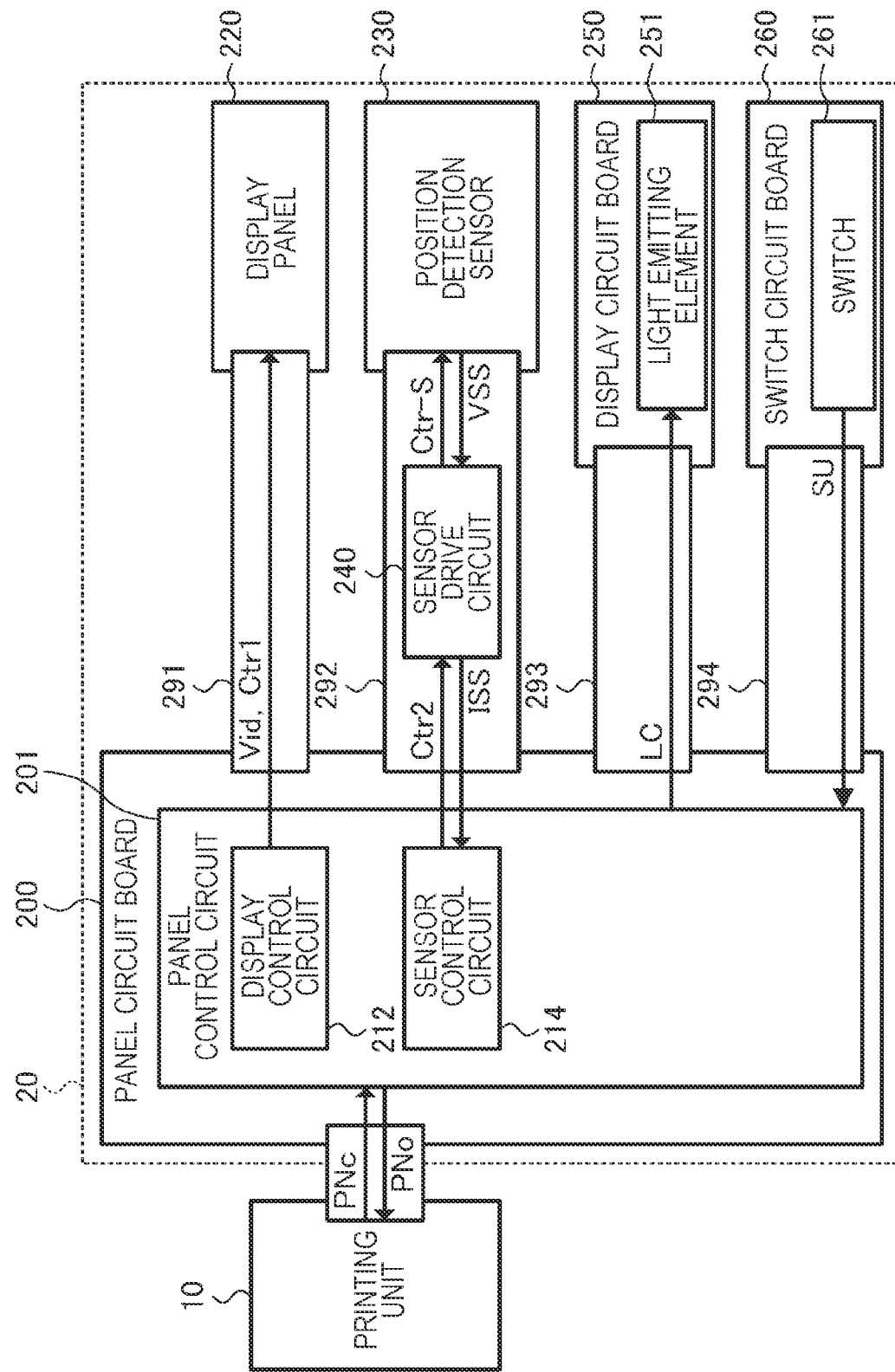
FIG. 2 is a diagram showing an example of a functional configuration of a panel unit.

Next, a functional configuration of the panel unit 20 will be described. FIG. 2 is a diagram showing an example of the functional configuration of the panel unit 20. As shown in FIG. 2, the panel unit 20 includes a panel circuit board 200, a display panel 220, a position detection sensor 230, a sensor drive circuit 240, a display circuit board 250, and a switch circuit board 260.

The panel circuit board 200 includes a panel control circuit 201. Further, the panel control circuit 201 includes a display control circuit 212 that controls the display panel 220 and a sensor control circuit 214 that controls the position detection sensor 230. Then, the panel control circuit 201 controls the display panel 220, the position detection sensor 230, the sensor drive circuit 240, the display circuit board 250, and the switch circuit board 260 based on the panel control signal PNc input from the printing unit 10, and outputs signals output by the display panel 220, the position detection sensor 230, the sensor drive circuit 240, the display circuit board 250, and the switch circuit board 260 as the panel operation signal PNo to the printing unit 10. Such a panel control circuit 201 is configured as one or more integrated circuit devices. The display circuit board 250 and the switch circuit board 260 may be electrically coupled to the relay circuit board 100 without going through the panel control circuit 201.

The display control circuit 212 outputs a control signal Ctr1 that defines the operation of the display panel 220 and an image signal Vid indicating an image to be displayed on the display panel 220 to the display panel 220 via a cable 291. Thereby, the display control circuit 212 controls the display panel 220 so that an image based on the image signal Vid is displayed. Here, the image signal Vid may be an analog signal or a digital signal.

Figure 3:
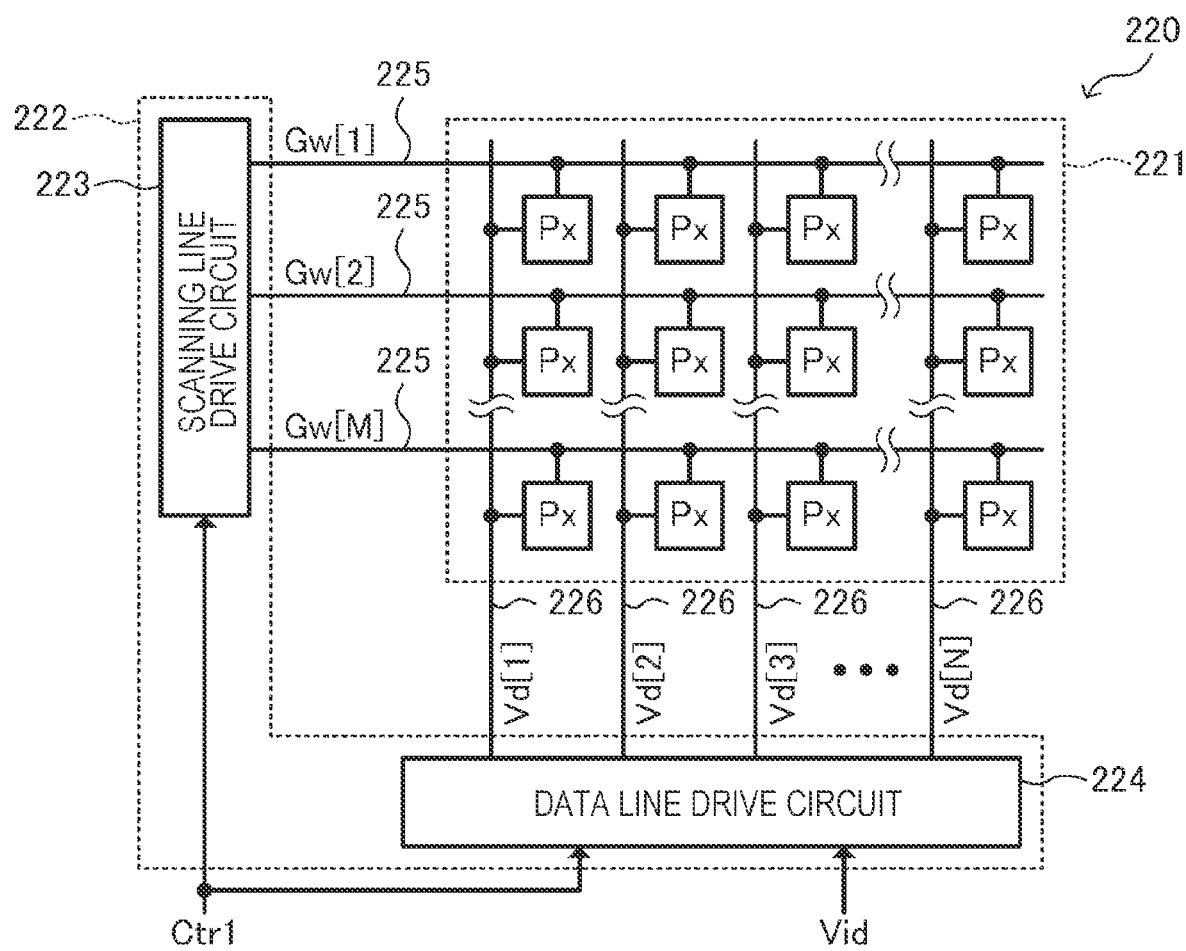
FIG. 3 is a diagram showing an example of a configuration of a display panel.

FIG. 3 is a diagram showing an example of the configuration of the display panel 220. As shown in FIG. 3, the display panel 220 includes a pixel portion 221 provided with a plurality of pixels Px, and a pixel drive portion 222 that drives the pixel portion 221.

The pixel portion 221 includes M rows of scanning lines 225 extending in a first direction, which is a horizontal direction in FIG. 3, and N columns of data lines 226 extending in a second direction, which is a vertical direction in FIG. 3 orthogonal to the first direction. Then, the pixel portion 221 includes M×N pixels Px provided in a matrix of N columns in the first direction and M rows in the second direction corresponding to intersections at which the M rows of scanning lines 225 and the N columns of data lines 226 intersect with each other.

The pixel drive portion 222 includes a scanning line drive circuit 223 and a data line drive circuit 224. The scanning line drive circuit 223 generates a selection signal Gw[m] for selecting the scanning line 225 in the m-th row based on the control signal Ctr1. Then, the scanning line drive circuit 223 outputs the selection signal Gw[m] (m is a natural number satisfying $1 \leq m \leq M$) in an m-th horizontal scanning period among M horizontal scanning periods included in a frame period defined by the control signal Ctr1. Thereby, the scanning line drive circuit 223 can sequentially select the scanning lines 225 in the first row to the M-th row in the frame period.

The data line drive circuit 224 generates a gradation designation signal Vd[n] (n is a natural number satisfying $1 \leq n \leq N$) that designates a gradation to be displayed in the pixel Px based on the image signal Vid, and outputs the gradation designation signal Vd[n] for the data line 226 in the n-th column in the m-th horizontal scanning period in which the scanning line drive circuit 223 selects the scanning line 225 in the m-th row. In the present embodiment, the image signal Vid is a signal including gradation designation signals Vd[1] to Vd[N].

In this way, in the m-th horizontal scanning period, by outputting the selection signal Gw[m] for selecting the scanning line 225 in the m-th row and outputting the gradation designation signal Vd[n] for the data line 226 in the n-th column, the pixel drive portion 222 can display the gradation designated by the gradation designation signal Vd[n] on the pixel Px in the m-th row and the n-th column. As such a display panel 220, for example, a thin flat panel such as a liquid crystal display (LCD) panel or an electro luminescence (EL) panel can be used.

Referring back to FIG. 2, the sensor control circuit 214 outputs a control signal Ctr2 that defines the operation of the sensor drive circuit 240 to the sensor drive circuit 240, which is an integrated circuit device which is chip on film (COF)-mounted on a cable 292. The sensor drive circuit 240 generates a control signal Ctr-S for controlling the drive of the position detection sensor 230 based on the input control signal Ctr2, and outputs the control signal Ctr-S to the position detection sensor 230. That is, the sensor control circuit 214 controls the drive of the position detection sensor 230 via the sensor drive circuit 240. When the position detection sensor 230 is driven by the control signal Ctr-S, the position detection sensor 230 detects the contact of an object such as a finger or a pen with the position detection sensor 230. Then, the position detection sensor 230 generates a detection signal VSS indicating a result of the detection and outputs the detection signal VSS to the sensor drive circuit 240. The sensor drive circuit 240 calculates a contact position of the object with respect to the position detection sensor 230 based on the detection signal VSS, and generates a contact position signal ISS indicating the contact position.

The sensor drive circuit 240 outputs the generated contact position signal ISS to the sensor control circuit 214.

Figure 4:
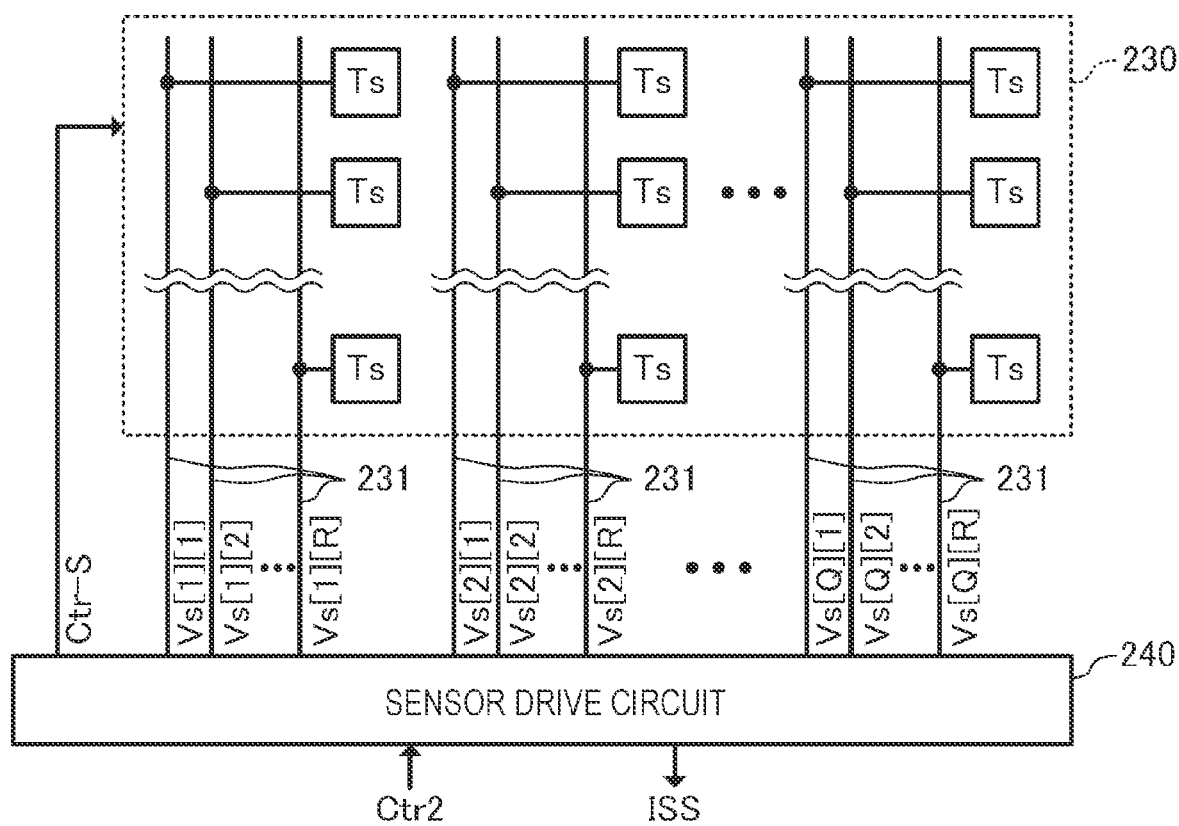
FIG. 4 is a diagram showing an example of a configuration of a position detection sensor and a sensor drive circuit.

FIG. 4 is a diagram showing an example of the configuration of the position detection sensor 230 and the sensor drive circuit 240. As shown in FIG. 4, the position detection sensor 230 includes Q×R sensors Ts provided in a matrix of Q columns in a third direction, which is the horizontal direction in FIG. 4, and R rows in a fourth direction, which is the vertical direction in FIG. 4 orthogonal to the third direction, and Q×R detection lines 231 corresponding to the Q×R sensors Ts in a one-to-one manner.

Each of sensors Ts includes a capacitive element. Then, when an object comes into contact with the sensor Ts, the potentials of two electrodes of the capacitive elements provided corresponding to the sensor Ts fluctuate.

The sensor drive circuit 240 generates a control signal Ctr-S based on the control signal Ctr2, and outputs the generated control signal Ctr-S to the position detection sensor 230. Here, the control signal Ctr-S is a signal instructing the sensor Ts[q][r] in the q-th row and r-th column to output a detection signal Vs[q][r] indicating the potential of one of the two electrodes of each sensor Ts to the detection line 231 provided corresponding to the sensor Ts[q][r]. Thereby, the sensor drive circuit 240 can receive Q×R detection signals Vs supplied from the Q×R sensors Ts. The detection signal VSS described above is, for example, a signal including Q×R detection signals Vs. Then, the sensor drive circuit 240 generates a contact position signal ISS based on the Q×R detection signals Vs included in the detection signal VSS, and outputs the generated contact position signal ISS to the panel control circuit 201. That is, the position detection sensor 230 in the present embodiment is a so-called capacitive sensor that calculates the contact position of an object according to a change in the potential of the capacitive element of the sensor Ts.

Referring back to FIG. 2, the display circuit board 250 includes a light emitting element 251. Then, the panel control circuit 201 outputs a light emission control signal LC for controlling the light emitting element 251 in the display circuit board 250. The light emitting element 251 turns on, turns off, or blinks according to the operating state of the printing device 1. That is, the light emitting element 251 is electrically coupled to the panel circuit board 200 and displays the operating states of the printing device 1 and the printing unit 10, and the display circuit board 250 includes the light emitting element 251 that displays the operating states of the printing device 1 and the printing unit 10. Although FIG. 2 shows only the case where the display circuit board 250 includes one light emitting element 251, the display circuit board 250 may include a plurality of light emitting elements 251. Further, as such a light emitting element 251, for example, a light emitting diode (LED) element can be used.

The switch circuit board 260 includes a switch 261. When the switch 261 is pressed, a switch control signal SU is supplied to the panel control circuit 201. Then, the panel control circuit 201 activates the printing device 1 according to the logic level, time, and the like of the switch control signal SU, and also stops the operation of the printing device 1. That is, the switch 261 is electrically coupled to the panel circuit board 200 and activates the printing device 1 and the printing unit 10, and the switch circuit board 260 includes the switch 261 that activates the printing device 1 and the printing unit 10.

As described above, the panel unit 20 includes the display panel 220 that displays various types of information, the position detection sensor 230 that detects the contact position of an object such as a finger or a pen, the panel circuit board 200 on which the panel control circuit 201 electrically coupled to the position detection sensor 230 and the display panel 220 is mounted, the cable 292 that electrically couples the position detection sensor 230 and the panel circuit board 200 to each other, the display circuit board 250 including the light emitting element 251 that is electrically coupled to the panel control circuit 201 mounted on the panel circuit board 200 and displays the operating state of the printing device 1 including the printing unit 10, and the switch circuit board 260 including the switch 261 that is electrically coupled to the panel control circuit 201 mounted on the panel circuit board 200 and activates the printing device 1 including the printing unit 10.

3. Structure of Printing Device

Next, the structure of the printing device 1 will be described. Here, in describing the structure of the printing device 1, the front-rear direction of the printing device 1 may be referred to as an X direction, the left-right direction of the printing device 1 may be referred to as a Y direction, and the vertical direction, which is the up-down direction of the printing device 1, may be referred to as a Z direction. Further, when the orientations of the X direction, the Y direction, and the Z direction are specified, the tip end side of the arrow indicating the X direction shown in the drawing may be referred to as a +X side, and the starting point side thereof may be referred to as a −X side, the tip end side of the arrow indicating the Y direction shown in the drawing may be referred to as a +Y side, and the starting point side thereof may be referred to as a −Y side, and the tip end side of the arrow indicating the Z direction shown in the drawing may be referred to as a +Z side, and the starting point side thereof may be referred to as a −Z side.

Figure 5:
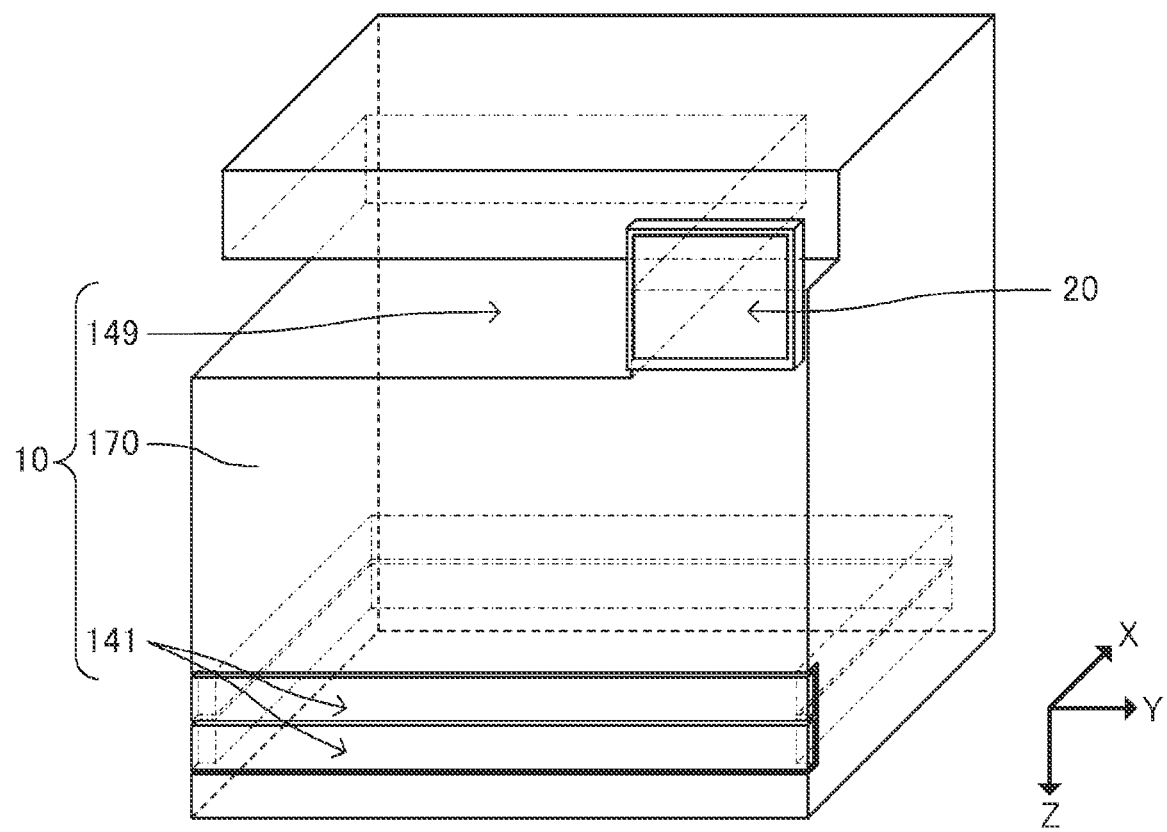
FIG. 5 is a diagram showing an external structure of the printing device.

FIG. 5 is a diagram showing an external structure of the printing device 1. As shown in FIG. 5, the printing device 1 includes the printing unit 10 and the panel unit 20. The panel unit 20 is rotatably attached to the +Z side, which is the side surface on the −X side of the housing 170 in the printing device 1.

Figure 6:
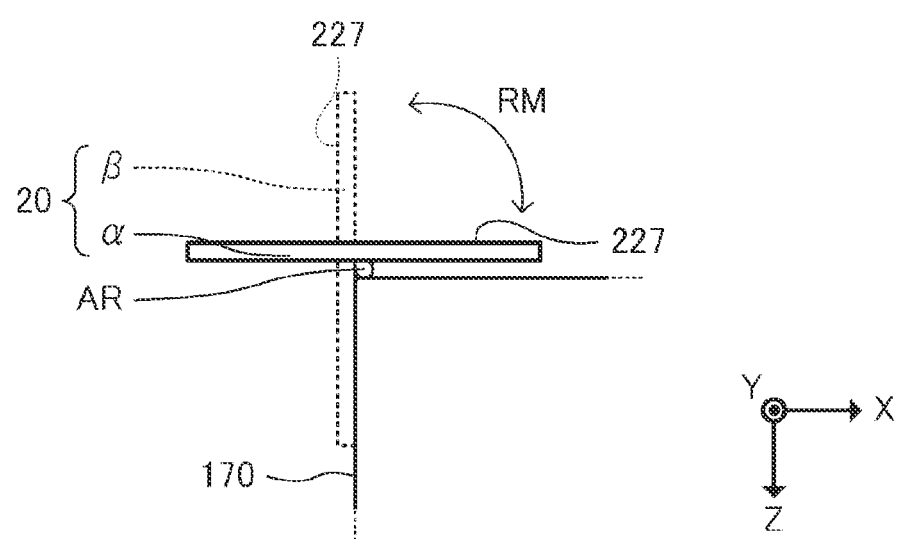
FIG. 6 is a diagram for describing an example of an attachment state of the panel unit.

FIG. 6 is a diagram for describing an example of an attachment state of the panel unit 20 attached to the housing 170. As shown in FIG. 6, the panel unit 20 is rotatably attached to the housing 170 via an attachment portion AR. Specifically, in the present embodiment, the panel unit 20 is rotatably attached to the housing 170 of the printing unit 10 with the attachment portion AR as a rotation axis within the range of a movable range RM so as to take an attachment state α in which a display surface 227 of the display panel 220 described above and the position detection sensor 230 extend along a plane formed by the X direction, which is the front-rear direction of the printing device 1, and the Y direction, which is the left-right direction of the printing device 1, and an attachment state in which the display surface 227 of the display panel 220 described above and the position detection sensor 230 extend along a plane formed by the Y direction, which is the left-right direction of the printing device 1, and the Z direction, which is the up-down direction and the vertical direction of the printing device 1.

That is, the panel unit 20 is rotatably attached to the housing 170 so as to take the attachment state α in which the displayed contents of the display panel 220 of the panel unit 20 can be visually recognized by the user and the contents of the display panel 220 can be visually recognized when the panel unit 20 is viewed from the upper side to the lower side of the printing device 1, that is, from the −Z side to the +Z side, and the attachment state β in which the contents of the display panel 220 can be visually recognized by the user when the panel unit 20 is viewed from the front to the rear of the printing device 1, that is, from the −X side to the +X side.

Here, in view of improving the convenience of the user who operates the printing device 1, the movable range RM of the panel unit 20 rotatably attached to the housing 170 is preferably wide, specifically, it is preferable that in the attachment state α, a normal direction of the display surface 227 of the display panel 220 and the position detection sensor 230 is upward along the substantially vertical direction and faces the +Z side of the printing device 1, and in the attachment state β, the normal direction of the display surface 227 of the display panel 220 and the position detection sensor 230 faces the −X side of the printing device 1 corresponding to the user side where the user is located in the printing device 1 along the horizontal direction.

However, the movable range RM of the panel unit 20 rotatably attached to the housing 170 is not limited to the above-mentioned range, and the information displayed on the display panel 220 of the panel unit 20 provided so as to be rotatable by the user who operates the printing device 1 may be rotatable within a visible range. Specifically, in the attachment state α, an angle formed by a plane extending in the horizontal direction and formed by the X direction and the Y direction and a direction in which the display panel 220 and the position detection sensor 230 of the panel unit 20 extend may be 45 degrees or less, and in the attachment state β, the angle formed by the plane extending in the horizontal direction and formed by the X direction and the Y direction and the direction in which the display panel 220 and the position detection sensor 230 of the panel unit 20 extend may be 45 degrees or more.

That is, the panel unit 20 may be rotatably attached to the housing 170 of the printing unit 10 so as to take the attachment state α in which the angle formed by the horizontal direction and a normal direction of the display panel 220 and the position detection sensor 230 is larger than the angle formed by the vertical direction and the normal direction of the display panel 220 and the position detection sensor 230 and the attachment state β in which the angle formed by the horizontal direction and the normal direction of the display panel 220 and the position detection sensor 230 is smaller than the angle formed by the vertical direction and the normal direction of the display panel 220 and the position detection sensor 230. Here, the attachment state a is an example of a first attachment state, and the attachment state β is an example of a second attachment state.

Figure 7:
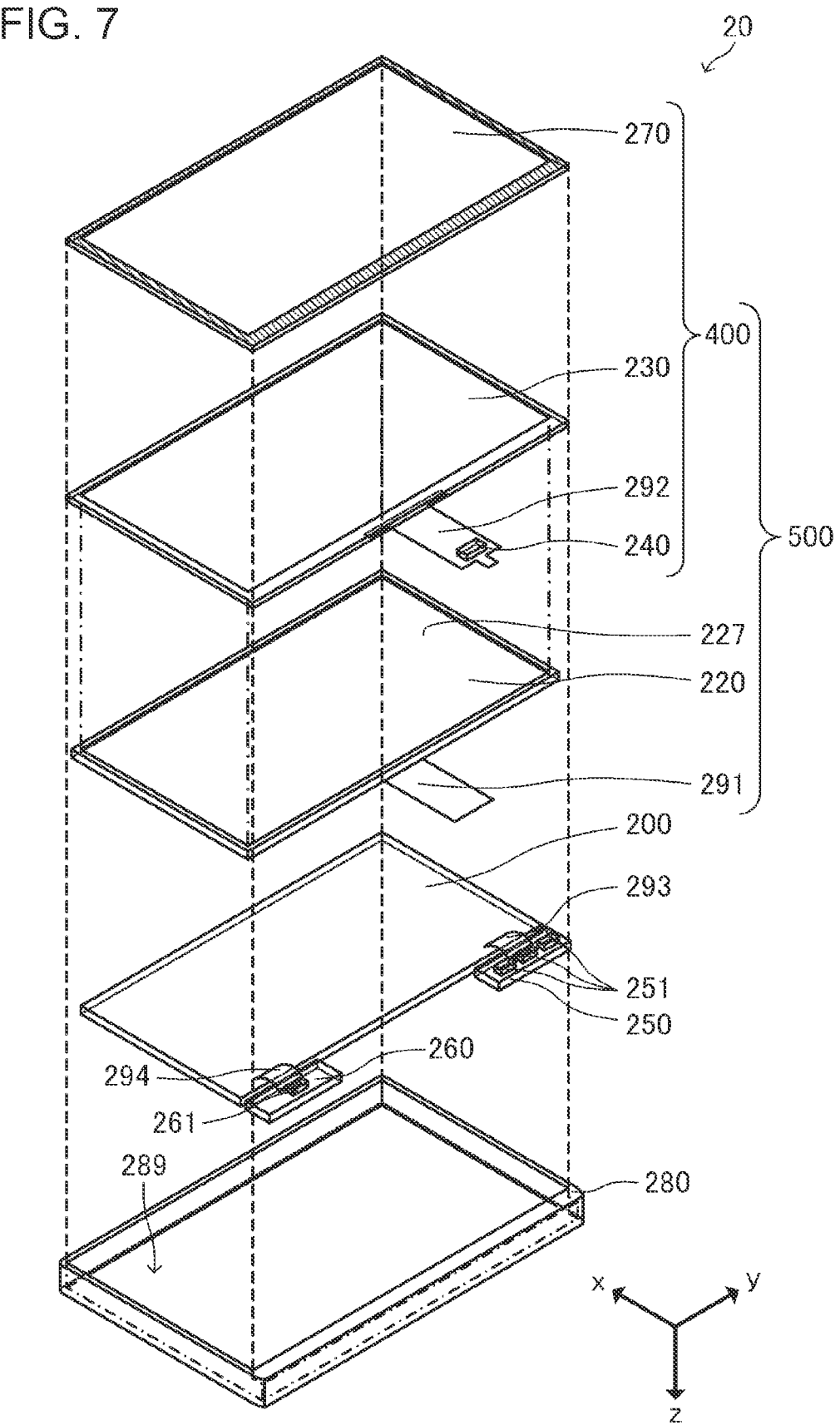
FIG. 7 is a diagram for describing a structure of the panel unit.

Next, an example of a specific structure of the panel unit 20 rotatably attached to the housing 170 as described above will be described. FIG. 7 is a diagram for describing the structure of the panel unit 20. Here, in describing the structure of the panel unit 20, in the following description, an x direction, a y direction, and a z direction which are independent of the above-mentioned X direction, Y direction, and Z direction and are orthogonal to each other are used. Further, when the orientations of the x direction, the y direction, and the z direction are specified, the tip end side of the arrow indicating the x direction shown in the drawing may be referred to as a +x side, and the starting point side thereof may be referred to as a −x side, the tip end side of the arrow indicating the y direction shown in the drawing may be referred to as a +y side, and the starting point side thereof may be referred to as a −y side, and the tip end side of the arrow indicating the z direction shown in the drawing may be referred to as a +z side, and the starting point side thereof may be referred to as a −z side.

As shown in FIG. 7, the panel unit 20 includes a cover glass 270 and a panel housing 280 in addition to the panel circuit board 200, the display panel 220, the position detection sensor 230, the display circuit board 250, and the switch circuit board 260 described above.

The position detection sensor 230 is a substantially rectangular plate-shaped member extending in a plane formed by the x direction and the y direction, and is a so-called capacitive sensor that calculates the contact position of an object according to a change in the potential of the capacitive element as described above. The cable 292 on which the sensor drive circuit 240 is COF-mounted is attached to the side of the position detection sensor 230 on the −x side.

The cover glass 270 is located on the −z side of the position detection sensor 230. The cover glass 270 is a substantially rectangular plate-shaped member having the same size as the position detection sensor 230 and extending in a plane formed by the x direction and the y direction, and is fixed to the position detection sensor 230 with an adhesive (not shown) or the like so as to be laminated. The cover glass 270 functions as a protective member that protects the position detection sensor 230 from scratches and impacts. Here, in the following description, a configuration in which the position detection sensor 230 and the cover glass 270 are laminated and fixed with an adhesive or the like is referred to as a touch sensor 400. The touch sensor 400 in which the position detection sensor 230 and the cover glass 270 are laminated is an example of a touch sensor.

Figure 8:
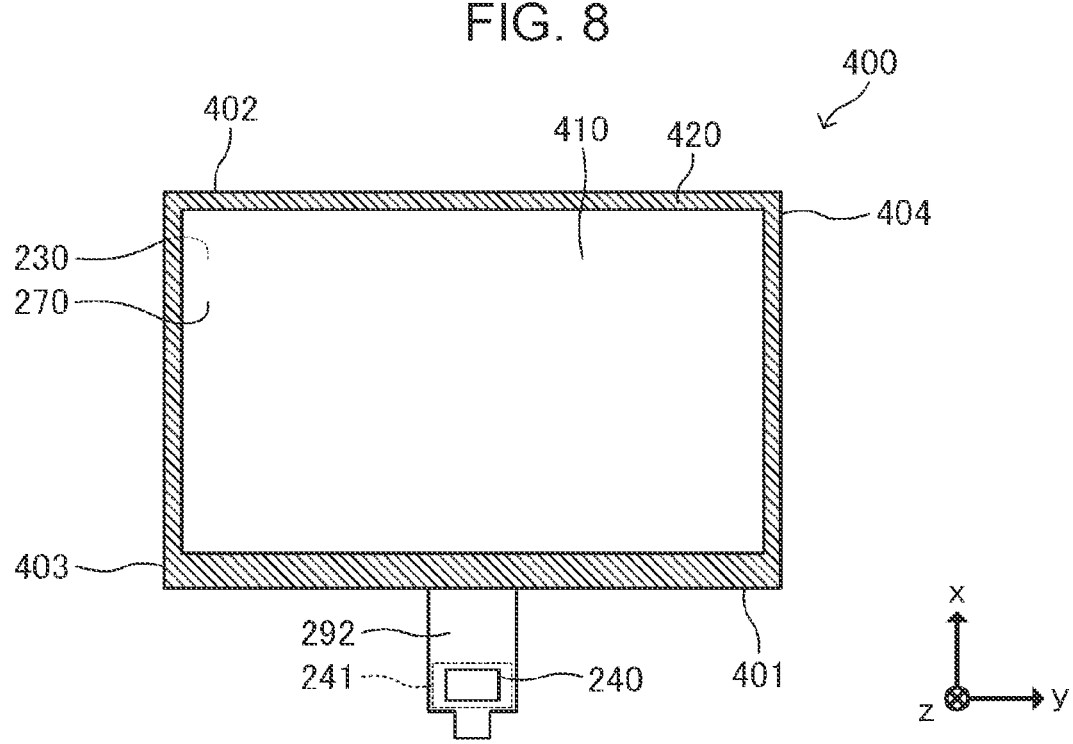
FIG. 8 is a view of a touch sensor when viewed from a −z side.
Figure 9:
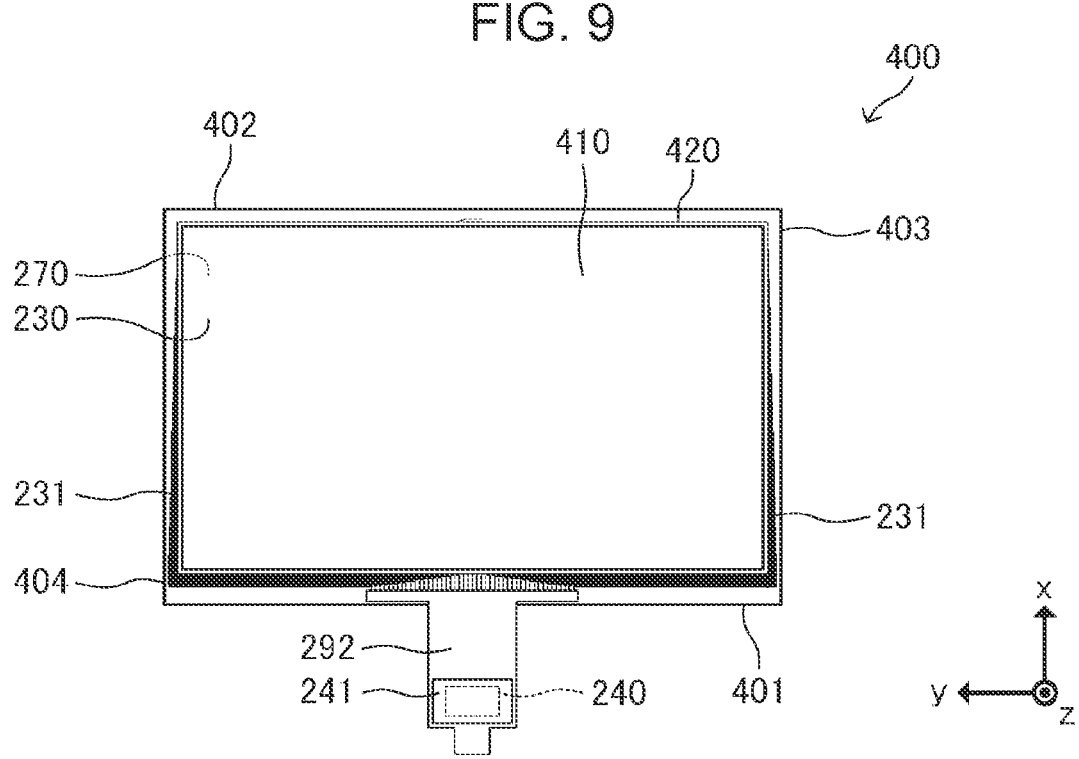
FIG. 9 is a view of the touch sensor when viewed from a +z side.

Here, an example of the structure of the touch sensor 400 will be described with reference to FIGS. 8 and 9. FIG. 8 is a view of the touch sensor 400 when viewed from the −z side, and FIG. 9 is a view of the touch sensor 400 when viewed from the +z side. That is, FIG. 8 corresponds to a view of the touch sensor 400 when viewed from the surface of the cover glass 270 side, and FIG. 9 corresponds to a view of the touch sensor 400 when viewed from the position detection sensor 230 side.

As shown in FIGS. 8 and 9, the touch sensor 400 has a substantially rectangular shape including a side 401, a side 402 located on the +x side of the side 401 and facing the side 401 along the x direction, a side 403 intersecting both the side 401 and the side 402, and, and a side 404 located on the +y side of the side 403 and facing the side 403 along the y direction. Here, the side 401 is an example of a first side, the side 402 is an example of a second side, the side 403 is an example of a third side, and the side 404 is an example of a fourth side.

As shown in FIGS. 8 and 9, the cable 292 is electrically coupled to the side 401 of the touch sensor 400. Then, the sensor drive circuit 240 is COF-mounted on the −z side surface of the cable 292 and a metal plate 241 is located in an area located facing the COF-mounted sensor drive circuit 240, which is the surface of the cable 292 on the +z side, via the cable 292. The touch sensor 400 is electrically coupled to the panel circuit board 200 via this cable 292.

Further, as shown in FIGS. 8 and 9, the touch sensor 400 includes an operation area 410 that receives an input of operation information by the user and a frame area 420 that is provided around the operation area 410 and does not receive the input of the operation information by the user.

The operation area 410 is provided with transparent wiring (not shown) formed of, for example, indium tin oxide (ITO), and includes the above-described Q×R sensors Ts provided in a matrix with the x direction as the third direction and the y direction as the fourth direction. On the other hand, as shown in FIG. 9, the frame area 420 of the position detection sensor 230 is provided with a detection line 231 that electrically couples each of the Q×R sensors Ts provided in the operation area 410 to the sensor drive circuit 240. That is, in the frame area 420, a wiring for propagating the signal detected in the operation area 410 by the operation of the user is located. Further, as shown in FIG. 8, the frame area 420 of the cover glass 270 is colored, for example, black. Thereby, the boundary between the operation area 410 and the frame area 420 can be clearly notified to the user. The frame area 420 of the cover glass 270 may not be colored, or may be colored in a color other than black.

Referring back to FIG. 7, the display panel 220 is located on the +z side of the position detection sensor 230 so that the display surface 227 is on the −z side. Such a display panel 220 is a substantially rectangular plate-shaped member extending in a plane formed by the x direction and the y direction, and the size of the display surface 227 of the display panel 220 is at least larger than that of the operation area 410. Then, the display panel 220 is fixed to the position detection sensor 230 with an adhesive (not shown) or the like so that the entire area of the operation area 410 overlaps the display surface 227 in the direction along the z direction. That is, the position detection sensor 230 and the display panel 220 are laminated along the z direction. In addition, the cable 291 electrically coupled to the panel circuit board 200 is electrically coupled to the side of the display panel 220 on the −x side.

Here, in the following description, a configuration in which the touch sensor 400 including the position detection sensor 230 and the display panel 220 are laminated along the z direction is referred to as a touch panel 500. In the present embodiment, as described above, the position detection sensor 230 is a capacitive sensor. That is, the touch sensor 400 in the present embodiment is a capacitive touch sensor, and the touch panel 500 including the touch sensor 400 which is the capacitive touch sensor and the display panel 220 is a capacitive touch panel. That is, the touch panel 500 of the panel unit 20 of the present embodiment constitutes a capacitive touch panel in which the position detection sensor 230, the cover glass 270, and the display panel 220 are laminated.

The panel circuit board 200 is located on the +z side of the display panel 220. Then, the panel control circuit 201 in the panel circuit board 200 controls the operation of the touch panel 500 including the display panel 220 and the position detection sensor 230. Specifically, the panel circuit board 200 is electrically coupled to the display panel 220 via the cable 291 and is electrically coupled to the position detection sensor 230 via the cable 292. Then, the panel control circuit 201 provided on the panel circuit board 200 controls the operation of the display panel 220 via the cable 291 and controls the operation of the position detection sensor 230 via the cable 292.

The display circuit board 250 is located on the −x side of the panel circuit board 200. Three light emitting elements 251 are provided on the surface of the display circuit board 250 on the −z side. Further, the switch circuit board 260 is located on the −x side of the panel circuit board 200 and on the −y side of the display circuit board 250. The switch 261 is provided on the surface of the switch circuit board 260 on the −z side. The display circuit board 250 is electrically coupled to the panel circuit board 200 via a cable 293, and the switch circuit board 260 is electrically coupled to the panel circuit board 200 via a cable 294.

The panel housing 280 has a substantially rectangular parallelepiped shape having a storage space 289 with one surface on the −z side open, and is composed of a forming member obtained by molding, for example, resin or the like. The touch panel 500, the panel circuit board 200, the display circuit board 250, and the switch circuit board 260 described above are stored in the storage space 289 of the panel housing 280. In this case, the cover glass 270 of the touch panel 500 is provided so as to cover an open surface of the storage space 289.

Figure 10:
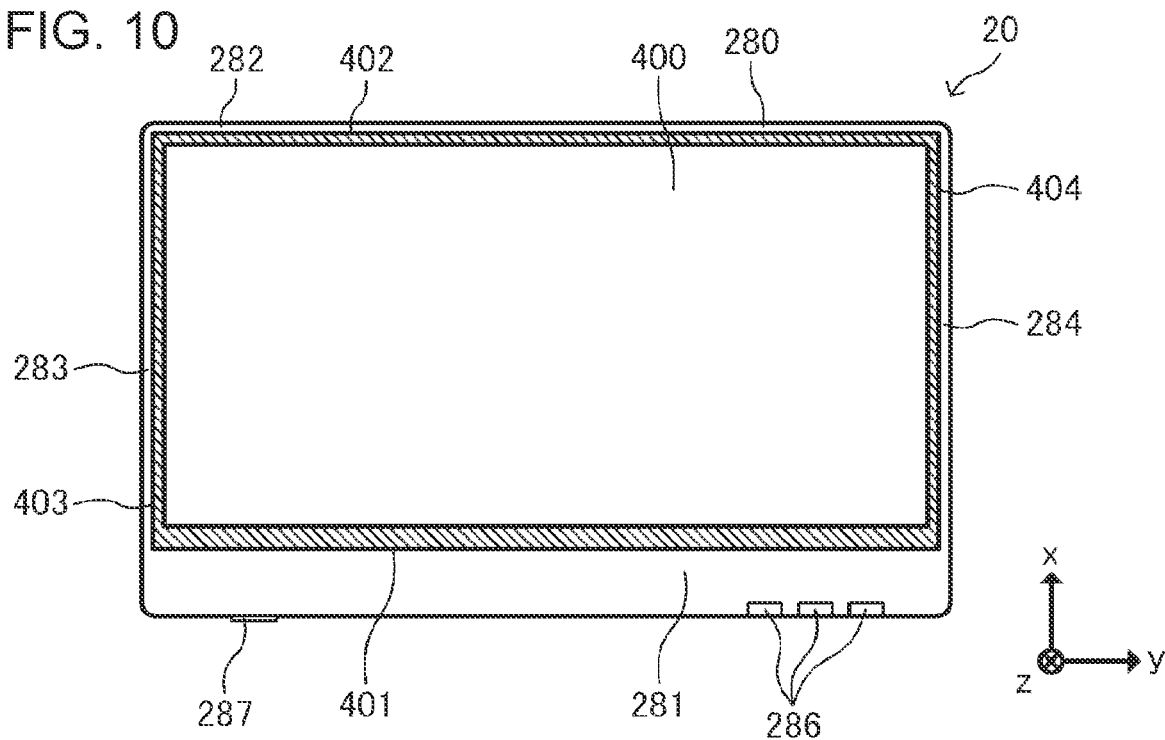
FIG. 10 is a view of the panel unit when viewed from the −z side.

Here, in the panel unit 20 configured as described above, the position detection sensor 230, the display panel 220, the panel circuit board 200, the display circuit board 250, and the switch circuit board 260 are stored in the panel housing 280. FIG. 10 is a view of the panel unit 20 in a state where the position detection sensor 230, the display panel 220, the panel circuit board 200, the display circuit board 250, and the switch circuit board 260 are stored in the panel housing 280 when viewed from the −z side, FIG. 11 is a view of the panel unit 20 when viewed from the −x side, and FIG. 12 is a view of the panel unit 20 when viewed from the +y side.

As shown in FIG. 10, the touch sensor 400 is stored in the panel housing 280 such that the side 401 and the side 402 are located facing each other along the x direction so that the side 401 is on the −x side and the side 402 is on the +x side, and the side 403 and the side 404 are located facing each other along the y direction so that the side 403 is on the −y side and the side 404 is on the +y side. Specifically, the panel housing 280 includes housing side portions 281, 282, 283, and 284 and a storage space 289 including the housing side portions 281, 282, 283, and 284. Then, the touch sensor 400 is stored in the storage space 289 such that the side 401 of the touch sensor 400 is located along the housing side portion 281, the side 402 of the touch sensor 400 is located along the housing side portion 282, the side 403 of the touch sensor 400 is located along the housing side portion 283, and the side 404 of the touch sensor 400 is located along the housing side portion 284.

Figure 11:
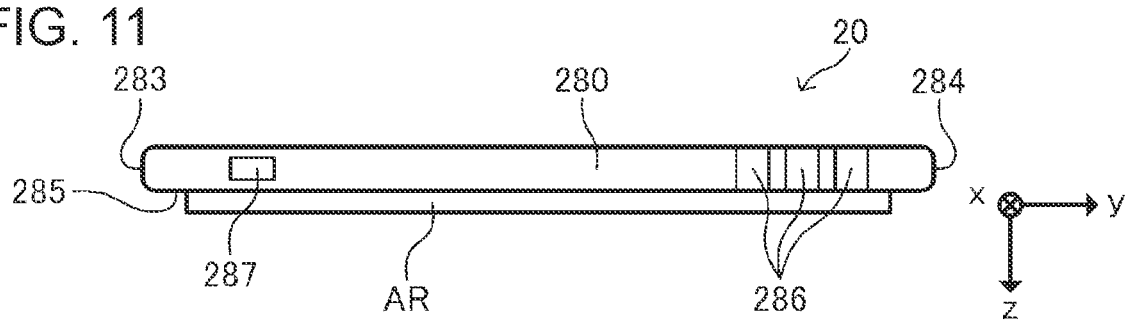
FIG. 11 is a view of the panel unit when viewed from a −x side.
Figure 12:
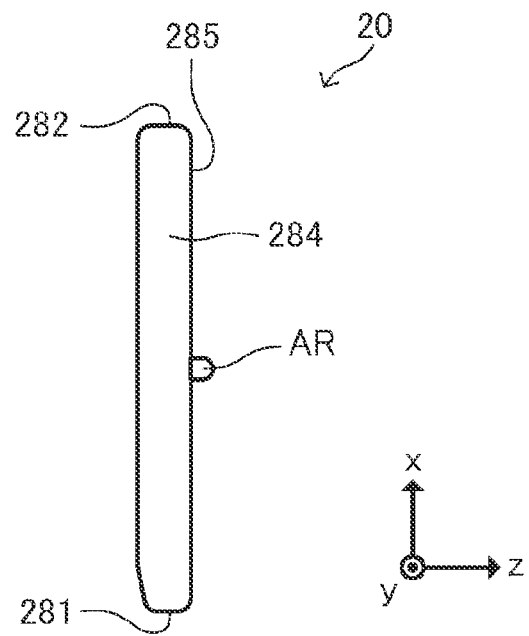
FIG. 12 is a view of the panel unit when viewed from a +y side.

Further, as shown in FIGS. 11 and 12, in the panel unit 20, the attachment portion AR is provided at the central portion of a bottom surface 285 of the panel housing 280 located facing the cover glass 270. In the panel unit 20 including the panel housing 280 in which the touch sensor 400 is stored, the attachment portion AR is a protrusion that is located at the central portion of the panel housing 280 in the direction from the side 401 to the side 402, that is, the direction along the x direction, and extends along the y direction. The panel unit 20 is rotatably attached to the printing unit 10 by rotatably attaching the attachment portion AR to the housing 170. That is, the panel unit 20 is rotatably attached to the printing unit 10 at the central portion of the panel housing 280 in the direction from the side 401 to the side 402.

Here, the fact that the attachment portion AR is located at the central portion of the panel housing 280 in the direction from the side 401 to the side 402, that is, the direction along the x direction means that, preferably, when the panel unit 20 is viewed along the z direction, the attachment portion AR is located such that at least a part thereof overlaps a point where a distance between the side surface on the −x side and the side surface on the +x side of the panel housing 280 is equal. However, the attachment portion AR may be located at least in an area between a first virtual straight line where a distance between a virtual straight line having the same distance between the side surface on the −x side and the side surface on the +x side of the panel housing 280 and the side surface on the −x side of the panel housing 280 is equal and a second virtual straight line where a distance between the virtual straight line having the same distance between the side surface on the −x side and the side surface on the +x side of the panel housing 280 and the side surface on the +x side of the panel housing 280 is equal.

That is, the central portion of the panel housing 280 in the direction from the side 401 to the side 402, that is, the direction along the x direction means the area between the above-mentioned first virtual straight line and the above-mentioned second virtual straight line.

Then, the panel unit 20 and the printing unit 10 are electrically coupled to each other by inserting the cable 210 into the attachment portion AR. That is, the panel circuit board 200 and the main circuit board 110 are electrically coupled to each other by a cable 210 for inserting the inside of the attachment portion AR to which the panel unit 20 is rotatably attached to the printing unit 10.

Further, as shown in FIGS. 10 and 11, a display window 286 and an operation switch 287 are provided on the housing side portion 281 of the panel housing 280.

The display window 286 is a resin member that transmits light, for example, a transparent color or a milky white color, and is located on the +y side of the housing side portion 281 such that at least a part of the panel unit 20 can be visually recognized when the panel unit 20 is viewed from the −z side along the z direction. In the storage space 289 of the panel housing 280 where the display window 286 is located, the light emitting element 251 of the display circuit board 250 stored in the panel housing 280 is located. Then, when the light emitting element 251 is turned on, turned off, or blinks according to the operating state of the printing device 1, the light generated by the light emitting element 251 is notified to the outside of the panel unit 20 via the display window 286.

Further, the operation switch 287 is located on the side surface of the panel housing 280 extending in a direction intersecting the extending direction of the display surface 227 of the display panel 220, which is the end of the panel housing 280 when the panel unit 20 is viewed from the −z side along the z direction and when viewed from the direction along the normal direction of the touch sensor 400. Then, when the user operates the operation switch 287, the switch 261 of the switch circuit board 260 operates, whereby operation information of the user is input to the panel unit 20.

Further, the cable 292 is curved in the vicinity of the housing side portion 281 which is the end of the panel housing 280 and between the display circuit board 250 and the switch circuit board 260, and electrically couples the touch sensor 400 and the panel circuit board 200 to each other. Then, when the detection signal VSS generated by the contact of an object such as a finger or a pen with the touch sensor 400 is input to the sensor drive circuit 240 which is COF-mounted on the cable 292, the sensor drive circuit 240 generates the contact position signal ISS based on the detection signal VSS and outputs the contact position signal ISS to the sensor control circuit 214 in the panel control circuit 201.

The panel unit 20 configured as described above is attached to the printing unit 10 such that the side 401 of the touch sensor 400 is located on the −X side and the side 402 of the touch sensor 400 is located on the +X side in the attachment state α in which the display surface 227 of the display panel 220 and the position detection sensor 230 extend along a plane formed by the X direction, which is the front-rear direction of the printing device 1, and the Y direction, which is the left-right direction of the printing device 1, and is attached to the printing unit 10 such that the side 401 of the touch sensor 400 is located on the +Z side and the side 402 of the touch sensor 400 is located on the −Z side in the attachment state β in which the display surface 227 of the display panel 220 described above and the position detection sensor 230 extend along a plane formed by the Y direction, which is the left-right direction of the printing device 1, and the Z direction, which is the up-down direction and the vertical direction of the printing device 1. That is, when the panel unit 20 is in the attachment state β, the touch sensor 400 included in the touch panel 500 is disposed such that the side 401 is lower than the side 402 in the direction along the vertical direction.

Referring back to FIG. 5, the printing unit 10 includes a medium accommodating portion 141, a medium discharge tray 149, and a housing 170. The medium accommodating portion 141 forms an accommodating space in which the medium before the printing operation is executed is accommodated. Specifically, the medium accommodating portion 141 is located on the +Z side of the housing 170, and is attached such that at least a part of the accommodating space can be pulled out inside the housing 170. The medium discharge tray 149 is located on the −Z side of the housing 170, and the medium after the printing operation is executed is discharged. That is, the printing device 1 includes a medium discharge tray 149 to which the medium is discharged. The medium discharge tray 149 is an example of a discharge tray.

In the printing device 1 configured as described above, when the printing operation is executed by the user operating the panel unit 20, the printing operation is executed on the medium during a period in which the medium accommodated in the medium accommodating portion 141 is transported inside the housing 170 and the medium is transported inside the housing 170. Then, the medium after the printing operation is executed is discharged to the medium discharge tray 149.

Figure 13:
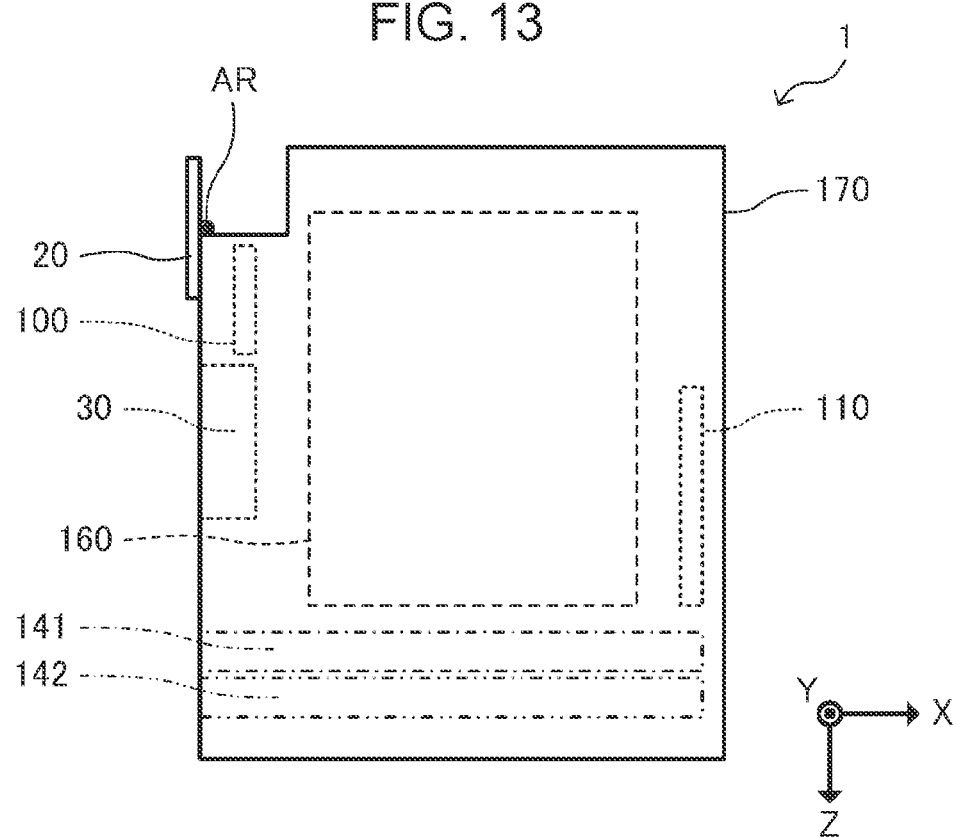
FIG. 13 is a diagram showing an example of an internal structure of the housing.

Here, the internal structure of the housing 170 included in the printing unit 10 will be described. FIG. 13 is a diagram showing an example of the internal structure of the housing 170. As shown in FIG. 13, the housing 170 stores the relay circuit board 100, the main circuit board 110, the printing mechanism 160, and the wireless communication unit 30.

Specifically, the wireless communication unit 30 and the relay circuit board 100 are located along the side surface on the −X side of the housing 170 to which the panel unit 20 is rotatably attached. Specifically, the wireless communication unit 30 is located on the +Z side of the relay circuit board 100 along the side surface on the −X side of the housing 170, and the relay circuit board 100 is located on the −Z side of the wireless communication unit 30 along the side surface on the −X side of the housing 170. That is, the wireless communication unit 30 and the relay circuit board 100 are located near the side surface of the housing 170 to which the panel unit 20 is attached. At least a part of the relay circuit board 100 and at least a part of the wireless communication unit 30 may be located so as to overlap each other in the direction along the Y direction.

Further, the main circuit board 110 is located along the side surface on the +X side of the housing 170, which is located facing the side surface on the −X side of the housing 170 to which the panel unit 20 is rotatably attached. That is, the relay circuit board 100 is provided inside the housing 170 in the vicinity of the panel unit 20 with respect to the main circuit board 110. In other words, the relay circuit board 100 is provided at a position where the shortest distance between the panel unit 20 and the relay circuit board 100 is smaller than the shortest distance between the panel unit 20 and the main circuit board 110.

Further, in this case, the relay circuit board 100 is located between the panel unit 20 and the main circuit board 110 when the printing device 1 is viewed along the Y direction. That is, the relay circuit board 100 is provided at a position where the shortest distance between the main circuit board 110 and the relay circuit board 100 is smaller than the shortest distance between the main circuit board 110 and the panel unit 20. That is, in a state where the relay circuit board 100 in the present embodiment is located closer to the panel unit 20 than the main circuit board 110, and the panel unit 20 is attached to the printing device 1, the printing device 1 is located between the main circuit board 110 and the panel unit 20 when the printing device 1 is viewed along the Y direction, which is the direction from the side 404 of the touch sensor 400 of the panel unit 20 toward the side 403.

Further, it is preferable that the shortest distance between the relay circuit board 100 and the panel unit 20 is located so as to be smaller than the shortest distance between the relay circuit board 100 and the main circuit board 110, and the wiring length of the cable 210 that electrically couples the panel unit 20 and the relay circuit board 100 to each other is shorter than the wiring length of the cable 191 that electrically couples the relay circuit board 100 and the main circuit board 110 to each other.

In the printing device 1 configured as described above, the panel unit 20 having the touch panel 500 for the user to input operation information is provided outside the housing 170, and the wireless communication unit 30 for performing wireless communication with an external device and the connectors CN1 and CN2 to which the wireless communication unit 30 is coupled are provided inside the housing 170, unlike the panel unit 20 having the touch panel 500 for the user to input operation information. Thereby, even when the size of the touch panel 500 is increased, a possibility that the size of the panel unit 20 becomes large due to a function other than the touch panel is reduced. That is, even when the printing device 1 is provided with the large touch panel 500, the possibility that the panel unit 20 becomes large is reduced. As a result, when the user operates the existing configuration included in the printing device 1, the possibility that the panel unit 20 interferes with the operation is reduced.

Further, since the connectors CN1 and CN2 to which the wireless communication unit 30 for performing wireless communication with the external device is connected are provided on the relay circuit board 100 disposed in the vicinity of the panel unit 20, the wireless communication unit 30 can be disposed in the vicinity of the panel unit 20. Thereby, even when the printing device 1 includes the NFC module 31 that performs wireless communication at a short distance of several cm to several tens of cm as the wireless communication unit 30, the NFC module 31 can be provided in the vicinity of an operator who operates the panel unit 20 and at a position where the panel unit 20 does not interfere with wireless communication at a short distance in the NFC module 31. As a result, mutual interference of signals between the panel unit 20 and the NFC module 31 can be reduced, and the possibility of impairing operability between the panel unit 20 and the NFC module 31 can be reduced.

Further, since the wireless communication unit 30 is electrically coupled to the main circuit board 110 via the relay circuit board 100, even when the main circuit board 110 is provided at a position away from the operator who operates the panel unit 20, which is the side surface on the +X side of the printing device 1, the wireless signal received by the wireless communication unit 30 can be converted into any signal that is not easily affected by noise on the relay circuit board 100. Thereby, the operational stability of the printing device 1 is improved.

That is, in the printing device 1 according to the present embodiment, by providing the relay circuit board 100 having the connectors CN1 and CN2 to which the wireless communication unit 30 is coupled at a position where the shortest distance between the panel unit 20 and the relay circuit board 100 is smaller than the shortest distance between the panel unit 20 and the main circuit board 110, it is possible to solve a plurality of problems caused by the increase in size of the panel unit 20 at the same time. Therefore, even when the printing device 1 includes a large touch panel 500 in which the size of the touch sensor 400 in the diagonal direction, which is included in the touch panel 500 of the panel unit 20, is 10 inches or more, the operability of the printing device 1 and the operational stability can be improved.

Figure 14:
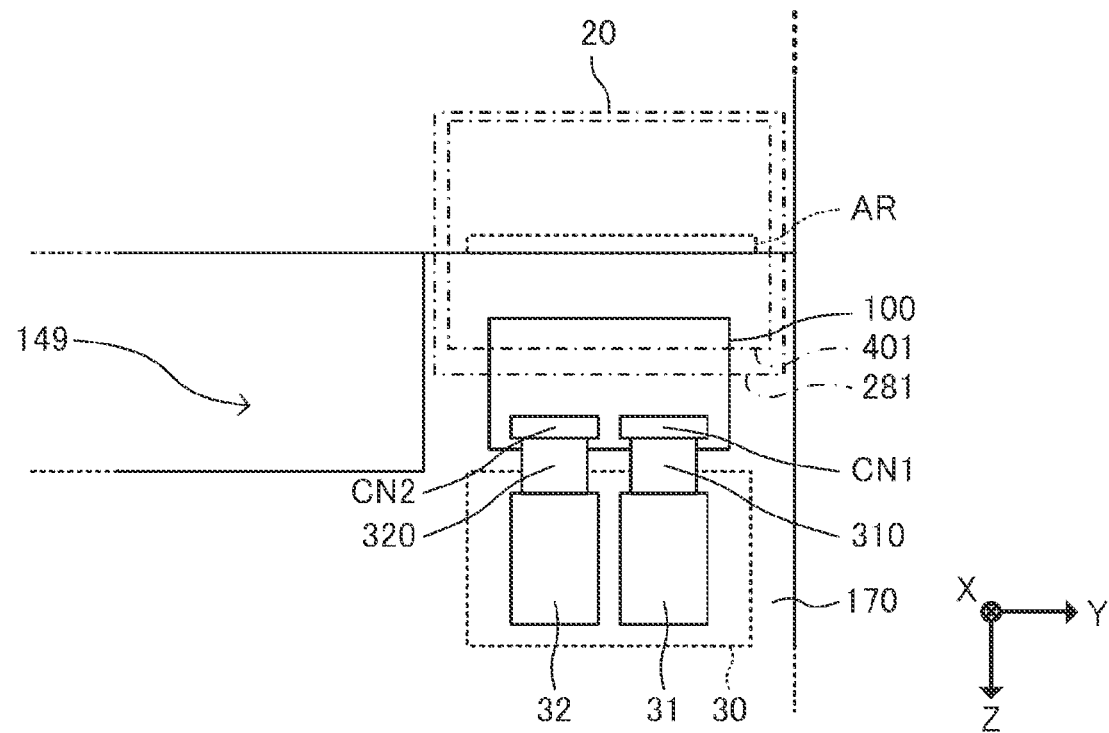
FIG. 14 is a diagram for describing a disposition relationship between the panel unit, a medium discharge tray, and a wireless communication unit.

Next, an example of the disposition relationship between the panel unit 20, the medium discharge tray 149, and the wireless communication unit 30 will be described. FIG. 14 is a diagram for describing the disposition relationship between the panel unit 20, the medium discharge tray 149, and the wireless communication unit 30. In FIG. 14, in order to describe the disposition relationship between the panel unit 20, the medium discharge tray 149, and the wireless communication unit 30, the NFC module 31 and the WiFi module 32 included in the wireless communication unit 30 stored inside the housing 170 are shown by solid lines, and the panel unit 20 located on the −X side in front of the printing device 1 with respect to the wireless communication unit 30 is shown by a broken line.

As shown in FIG. 14, in the printing device 1 according to the present embodiment, even when the panel unit 20 is in the attachment state β, the medium discharge tray 149 and the panel unit 20 are located so as not to overlap each other in the direction along the X direction, which is the front-rear direction of the printing device 1. That is, when the panel unit 20 is in the attachment state α, the medium discharge tray 149 and the panel unit 20 do not overlap each other in the direction from the side 401 to the side 402. Thereby, the possibility that the panel unit 20 interferes with the operation when the user takes out the medium discharged to the medium discharge tray 149 is reduced regardless of the angle of the rotatable panel unit 20. That is, even when the large touch panel 500 is provided, the operability of the printing device 1 can be further improved.

Further, as shown in FIG. 14, when the NFC module 31 is attached to the connector CN1 of the relay circuit board 100 and the WiFi module 32 is attached to the connector CN2 of the relay circuit board 100, even when the panel unit 20 is in the attachment state β, the NFC module 31 and the WiFi module 32 and the panel unit 20 are located so as not to overlap each other in the direction along the X direction, which is the front-rear direction of the printing device 1. That is, the NFC module 31 and the WiFi module 32 and the panel unit 20 do not overlap each other in the direction from the side 401 to the side 402 when the panel unit 20 is in the attachment state α.

Thereby, the possibility that the large panel unit 20 impairs the operability of the NFC module 31 that performs wireless communication at a short distance of several cm to several tens of cm is reduced, and the possibility that the panel unit 20 blocks the wireless signal output from the WiFi module 32 and the wireless signal input to the WiFi module 32 is reduced. That is, it is possible to simultaneously improve the operability of the wireless communication unit 30 and the reliability of wireless communication.

Further, as shown in FIG. 14, when the NFC module 31 is attached to the connector CN1 of the relay circuit board 100 and the WiFi module 32 is attached to the connector CN2 of the relay circuit board 100, the NFC module 31 and the WiFi module 32 are located so as not to overlap each other in the direction along the X direction, which is the front-rear direction of the printing device 1. When a device that performs wireless communication including the NFC module 31 and the WiFi module 32 is disposed inside the housing 170, the strength of the wireless signal output by the device and the wireless signal input to the device decreases, and as a result, the quality of wireless communication deteriorates. That is, it is preferable that a device that performs wireless communication including the NFC module 31 and the WiFi module 32 is provided along the side surface of the housing 170. By locating the NFC module 31 and the WiFi module 32 so as not to overlap each other in the direction along the X direction, which is the front-rear direction of the printing device 1, both the NFC module 31 and the WiFi module 32 can be disposed in the vicinity of the side surface of the housing 170, and as a result, the quality of the wireless communication performed by the wireless communication unit 30 is improved.

Referring back to FIG. 13, the printing mechanism 160 is stored in which a medium accommodated in the medium accommodating portion 141 is transported and a printing operation is executed on the transported medium, between the wireless communication unit 30 and the relay circuit board 100 and the main circuit board 110 inside the housing 170.

Figure 15:
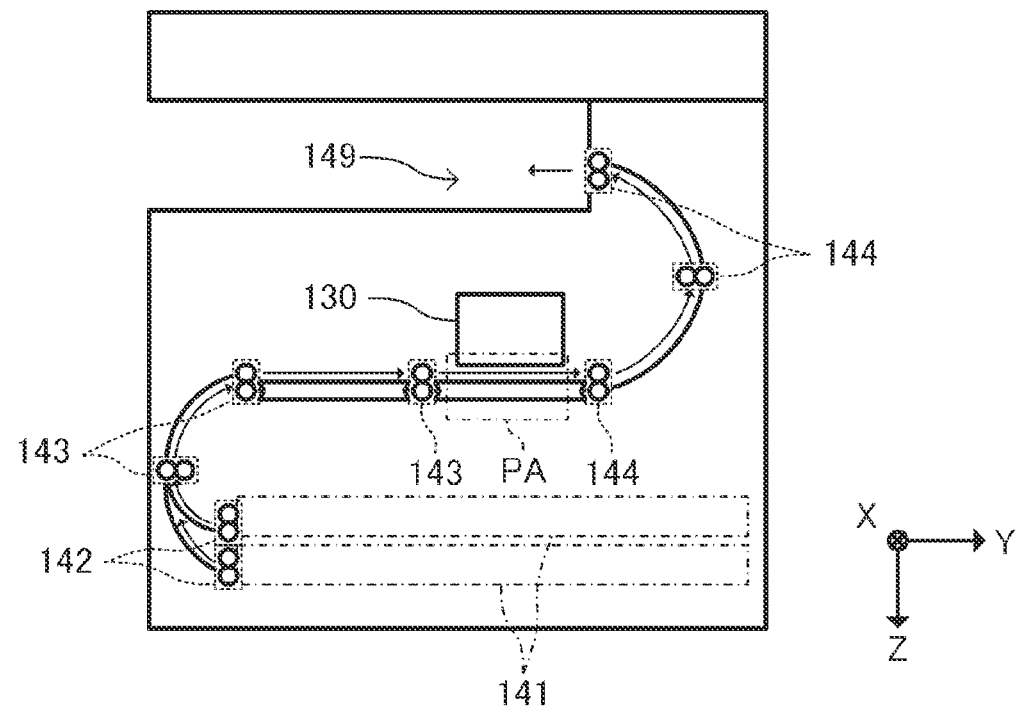
FIG. 15 is a diagram showing an example of a transport path of a medium transported by a printing mechanism provided inside the housing.

FIG. 15 is a diagram showing an example of a transport path of the medium transported by the printing mechanism 160 provided inside the housing 170. As shown in FIG. 15, transport rollers 142, 143, and 144 are provided inside the housing 170. Each of the transport rollers 142 to 144 includes a driving roller and a driven roller, and is a pair of rollers. Then, the transport rollers 142 to 144 pinch the medium between the driving roller and the driven roller, and the driving roller is rotated by the drive of the transport motor 150 described above, so that the medium is transported along a predetermined transport direction.

Specifically, the medium accommodated in the medium accommodating portion 141 is discharged one by one by the transport roller 142. Since the transport roller 142 discharges the medium accommodated in the medium accommodating portion 141 one by one, for example, the transport roller 142 may be provided so as to apply pressure to the medium from the −Z side to the +Z side along the Z direction. The medium discharged from the medium accommodating portion 141 is transported to a print area PA facing the ejection head 130 along the transport path in a state of being pinched by the transport roller 143. When the medium reaches the print area PA, the ejection head 130 ejects ink to the medium at a timing based on the print data signal DATA. After that, the medium on which the ink has landed is transported toward the medium discharge tray 149 along the transport path in a state of being pinched by the transport roller 144, and is discharged from the inside of the housing 170 to the medium discharge tray 149.

4. Effect

In the printing device 1 according to the present embodiment as described above, the panel unit 20 having the touch panel 500 for the user to input operation information is provided outside the housing 170, and the wireless communication unit 30 for performing wireless communication with an external device and the connectors CN1 and CN2 to which the wireless communication unit 30 is coupled are provided inside the housing 170, unlike the panel unit 20 having the touch panel 500 for the user to input operation information. Thereby, even when the size of the touch panel 500 is increased, the possibility that the size of the panel unit 20 becomes large is reduced. That is, even when the printing device 1 is provided with the large touch panel 500, the possibility that the panel unit 20 becomes large is reduced. As a result, when the user operates the existing configuration included in the printing device 1, the possibility that the panel unit 20 interferes with the operation is reduced.

Furthermore, since the connectors CN1 and CN2 to which the wireless communication unit 30 for performing wireless communication with the external device is coupled are provided on the relay circuit board 100 disposed in the vicinity of the panel unit 20, the wireless communication unit 30 can be disposed in the vicinity of the panel unit 20. Thereby, even when the printing device 1 includes the NFC module 31 that performs wireless communication at a short distance of several cm to several tens of cm as the wireless communication unit 30, the NFC module 31 can be provided in the vicinity of the operator who operates the panel unit 20 and at a position where the panel unit 20 does not interfere with wireless communication at a short distance in the NFC module 31. Therefore, mutual interference of signals between the panel unit 20 and the NFC module 31 can be reduced, and the possibility of impairing operability between the panel unit 20 and the NFC module 31 is reduced.

Further, since the wireless communication unit 30 is electrically coupled to the main circuit board 110 via the relay circuit board 100, even when the main circuit board 110 is provided at a position away from the operator who operates the panel unit 20, which is the side surface on the +X side of the printing device 1, the wireless signal received by the wireless communication unit 30 can be converted into any signal that is not easily affected by noise on the relay circuit board 100. Thereby, the operational stability of the printing device 1 is improved.

That is, in the printing device 1 according to the present embodiment, by providing the relay circuit board 100 having the connectors CN1 and CN2 to which the wireless communication unit 30 is coupled at a position where the shortest distance between the panel unit 20 and the relay circuit board 100 is smaller than the shortest distance between the panel unit 20 and the main circuit board 110, it is possible to solve a plurality of problems caused by the increase in size of the panel unit 20 at the same time.

Further, in this case, by disposing the relay circuit board 100 between the panel unit 20 and the main circuit board 110, and making the wiring length of the cable 210 that electrically couples the relay circuit board 100 and the panel unit 20 to each other shorter than the wiring length of the cable 191 that electrically couples the relay circuit board 100 and the main circuit board 110 to each other, the possibility of deterioration of the signal propagating between the panel unit 20 and the relay circuit board 100 is reduced. That is, the communication quality between the panel unit 20 and the relay circuit board 100 is improved, and as a result, the reliability of the printing device 1 is improved.

5. Modification Example

In the printing device 1 according to the present embodiment described above, it has been described that the NFC module 31 included in the wireless communication unit 30 is provided inside the housing 170 along the side surface on the +X side to which the panel unit 20 is attached. However, the NFC module 31 may be provided on the side surface on the +Y side of the housing 170, which is located adjacent to the side surface on the +X side of the housing 170 such that the NFC module 31 faces upward along the vertical direction and can receive a wireless signal.

Figure 16:
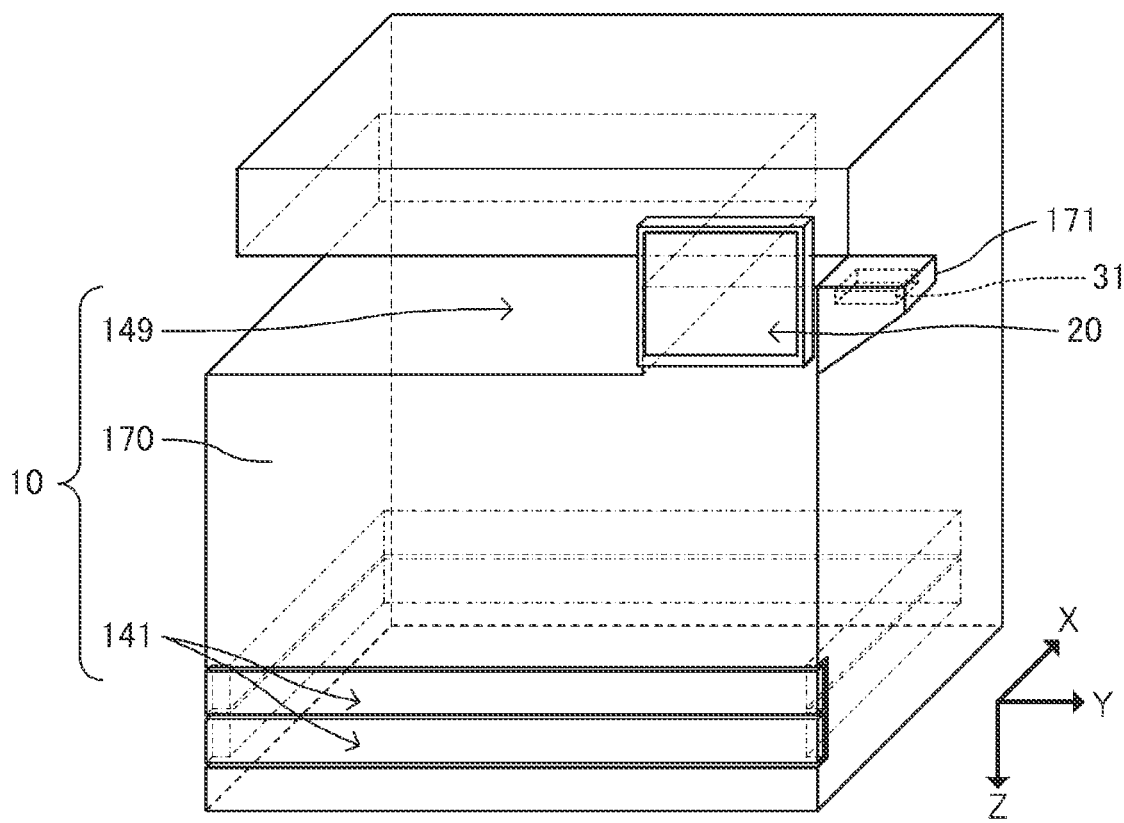
FIG. 16 is a diagram showing an external structure of a printing device according to a modification example.

FIG. 16 is a diagram showing an external structure of a printing device 1 according to a modification example. As shown in FIG. 16, the printing device 1 according to the modification example includes a table 171 projecting along the Y direction in the side surface on the +Y side of the housing 170 of the printing unit 10. Then, in the printing device 1 according to the modification example, the NFC module 31 is located inside the housing 170 and inside the table 171 along the side surface on the −Z side. That is, the NFC module 31 is located on the +Y side of the panel unit 20 at a position that does not overlap the panel unit 20 when the printing device 1 is viewed along the X direction.

As described above, the NFC module 31 is used for an authentication function or the like for correlating the user who executed the printing operation with the medium on which the printing operation is executed. Specifically, the user executes the authentication function by holding a predetermined card or the like over the NFC module 31. By disposing the NFC module 31 so as to be in contact with the upper surface of the housing 170 in such a printing device 1, even when the panel unit 20 has a large touch panel 500, the possibility of impairing the convenience of the user is further reduced.

That is, in the printing device 1 according to the modification example, in addition to the above-mentioned effects, the convenience of the user can be further enhanced.

The embodiments and modification examples have been described above, but the present disclosure is not limited to these embodiments and can be carried out in various modes without departing from the scope of the disclosure. For example, it is possible to combine the above-described embodiments as appropriate.

The present disclosure includes configurations that are substantially the same as the configurations described in the embodiments (for example, configurations having the same function, method, and result, or configurations having the same object and effect). Further, the present disclosure includes configurations in which non-essential parts of the configurations described in the embodiments are replaced. In addition, the present disclosure includes configurations that achieve the same effect as the configurations described in the embodiments or configurations that can achieve the same object. Further, the present disclosure includes configurations in which known techniques are added to the configurations described in the embodiment.

The following contents are derived from the above-described embodiment.

According to an aspect, there is provided a printing device including a printing unit that performs printing on a medium, and a panel unit to which operation information for operating the printing unit is input, in which the printing unit includes a printing mechanism that executes a printing operation according to the operation information, a main circuit board including a processor that controls an operation of the panel unit and controls an operation of the printing mechanism based on the operation information, and a relay board that relays a signal propagated between the main circuit board and the panel unit, the panel unit includes a display panel, a touch sensor in which a position detection sensor and a cover glass are laminated, and a panel circuit board electrically coupled to the touch sensor, the touch sensor includes a first side, a second side located facing the first side, a third side intersecting both the first side and the second side, and a fourth side located facing the third side, the panel unit is rotatably attached to the printing unit so as to take a first attachment state and a second attachment state, in the first attachment state, an angle formed by a horizontal direction and a normal direction of the touch sensor is larger than an angle formed by a vertical direction and the normal direction of the touch sensor, in the second attachment state, the angle formed by the horizontal direction and the normal direction of the touch sensor is smaller than the angle formed by the vertical direction and the normal direction of the touch sensor, when the panel unit is in the second attachment state, the touch sensor is disposed such that the first side is lower than the second side in a direction along the vertical direction, the relay board includes a wireless communication device attachment portion to which a wireless communication device configured to receive a wireless signal from an outside by wireless communication is attached, and a shortest distance between the panel unit and the relay board is smaller than a shortest distance between the panel unit and the main circuit board.

According to the printing device, by electrically coupling a panel unit into which operation information for operating a printing unit is input and a main circuit board including a processor that controls an operation of the panel unit and controls an operation of a printing mechanism based on the operation information to each other via a relay board including a wireless communication device attachment portion to which a wireless communication device capable of receiving a wireless signal from the outside by wireless communication is attached, and disposing the relay board such that the shortest distance between the panel unit and the relay board is smaller than the shortest distance between the panel unit and the main circuit board, the wireless communication device capable of receiving a wireless signal is provided near the panel unit and outside the panel unit. Thereby, from the viewpoint of displaying easy-to-understand information to the user, preventing malfunctions in the user, and improving the operability of the printing device by the user, when the panel unit has a large touch panel, the wireless communication device can be disposed outside and near the panel unit so as not to impair the operability of the wireless communication device and the panel unit.

Further, by electrically coupling the panel unit and the main circuit board to each other via the relay board including the wireless communication device attachment portion to which the wireless communication device is attached, even when the main circuit board and the panel unit are disposed apart from each other, it is possible to propagate the signal between the main circuit board and the relay board with high reliability by converting the signal into a signal that is not easily affected by noise or the like on the relay board. Therefore, the operational stability of the printing device is improved.

That is, according to the printing device, even when the printing device 1 has an additional function such as wireless communication and includes a panel unit having a large touch panel, the stability of the operation of the printing device can be improved by reducing the mutual interference of signals, and both the excellent operability of the panel unit and the high reliability of wireless communication can be achieved at the same time.

In the printing device according to the aspect, a shortest distance between the main circuit board and the relay board may be smaller than a shortest distance between the main circuit board and the panel unit.

According to the printing device, the relay board can be disposed between the panel unit and the main circuit board. Therefore, even when the printing device 1 has an additional function such as wireless communication and includes a panel unit having a large touch panel, the stability of the operation of the printing device can be improved by reducing the mutual interference of signals, and both the excellent operability of the panel unit and the high reliability of wireless communication can be achieved at the same time.

The printing device according to the aspect may further include a first wiring for electrically coupling the panel circuit board and the relay board to each other, and a second wiring for electrically coupling the relay board and the main circuit board to each other, and a wiring length of the first wiring may be shorter than a wiring length of the second wiring.

According to the printing device, by making the wiring length of the first wiring that electrically couples the relay board and the panel unit to each other shorter than the wiring length of the second wiring that electrically couples the relay board and the main circuit board to each other, the possibility of noise or the like interfering with the operation information input from the panel unit is reduced. Therefore, the operational stability of the printing device is further improved.

In the printing device according to the aspect, a size of the touch sensor in a diagonal direction may be 10 inches or more.

According to the printing device, even when the printing device 1 has an additional function such as wireless communication and includes a panel unit having a large touch panel, the stability of the operation of the printing device can be improved by reducing the mutual interference of signals, and both the excellent operability of the panel unit and the high reliability of wireless communication can be achieved at the same time. Thereby, even though the size of the touch sensor of the panel unit in the diagonal direction is 10 inches or more, both the excellent operability of the panel unit and the high reliability of wireless communication can be achieved in the printing device.

The printing device according to the aspect may further include a discharge tray to which the medium is discharged, and the discharge tray and the panel unit may not overlap in a direction from the first side to the second side in the first attachment state.

According to the printing device, when the user takes out the medium discharged to the discharge tray, the panel unit does not interfere with the taking-out operation. Therefore, the convenience of the user is further improved.

In the printing device according to the aspect, when the wireless communication device is attached to the wireless communication device attachment portion, the wireless communication device and the panel unit may not overlap in a direction from the first side to the second side in the first attachment state.

According to the printing device, the possibility that the signal of wireless communication by the wireless communication device is obstructed by the panel unit is reduced. Therefore, the reliability of wireless communication by the wireless communication device is improved.

In the printing device according to the aspect, the wireless communication device may include a first wireless communication device that performs short-range wireless communication, and the relay board may include, as the wireless communication device attachment portion, a first wireless communication device attachment portion to which the first wireless communication device is attached.

In the printing device according to the aspect, the wireless communication device may include a second wireless communication device configured to perform long-range and high-speed wireless communication as compared with the first wireless communication device, and the relay board may include, as the wireless communication device attachment portion, a second wireless communication device attachment portion to which the second wireless communication device is attached.

In the printing device according to the aspect, when the first wireless communication device and the second wireless communication device are attached to the relay board, the first wireless communication device and the second wireless communication device may not overlap in a direction from the first side to the second side in the first attachment state.

According to the printing device, both the first wireless communication device and the second wireless communication device can be disposed near the side surface of a main housing. Thereby, the reliability of wireless communication of both the first wireless communication device and the second wireless communication device is improved.

In the printing device according to the aspect, the position detection sensor may be a capacitive sensor, and the display panel and the touch sensor may constitute a capacitive touch panel.

What is claimed is:

1. A printing device comprising:
   a printing unit that performs printing on a medium; and
   a panel unit to which operation information for operating the printing unit is input, wherein
   the printing unit includes a printing mechanism that executes a printing operation according to the operation information, a main circuit board including a processor that controls an operation of the panel unit and controls an operation of the printing mechanism based on the operation information, and a relay board that relays a signal propagated between the main circuit board and the panel unit,
   the panel unit includes a display panel, a touch sensor in which a position detection sensor and a cover glass are laminated, and a panel circuit board electrically coupled to the touch sensor,
   the touch sensor includes a first side, a second side located facing the first side, a third side intersecting both the first side and the second side, and a fourth side located facing the third side,
   the panel unit is rotatably attached to the printing unit so as to take a first attachment state and a second attachment state,
   in the first attachment state, an angle formed by a horizontal direction and a normal direction of the touch sensor is larger than an angle formed by a vertical direction and the normal direction of the touch sensor,
   in the second attachment state, the angle formed by the horizontal direction and the normal direction of the touch sensor is smaller than the angle formed by the vertical direction and the normal direction of the touch sensor,
   when the panel unit is in the second attachment state, the touch sensor is disposed such that the first side is lower than the second side in a direction along the vertical direction,
   the relay board includes a wireless communication device attachment portion to which a wireless communication device configured to receive a wireless signal from an outside by wireless communication is attached, and a shortest distance between the panel unit and the relay board is smaller than a shortest distance between the panel unit and the main circuit board.

2. The printing device according to claim 1, wherein a shortest distance between the main circuit board and the relay board is smaller than a shortest distance between the main circuit board and the panel unit.

3. The printing device according to claim 1, further comprising:

a first wiring for electrically coupling the panel circuit board and the relay board to each other; and a second wiring for electrically coupling the relay board and the main circuit board to each other, wherein a wiring length of the first wiring is shorter than a wiring length of the second wiring.

4. The printing device according to claim 1, wherein a size of the touch sensor in a diagonal direction is 10 inches or more.

5. The printing device according to claim 1, further comprising:

a discharge tray to which the medium is discharged, wherein the discharge tray and the panel unit do not overlap in a direction from the first side to the second side in the first attachment state.

6. The printing device according to claim 1, wherein when the wireless communication device is attached to the wireless communication device attachment portion, the wireless communication device and the panel unit do not overlap in a direction from the first side to the second side in the first attachment state.

7. The printing device according to claim 1, wherein the wireless communication device includes a first wireless communication device that performs short-range wireless communication, and the relay board includes, as the wireless communication device attachment portion, a first wireless communication device attachment portion to which the first wireless communication device is attached.

8. The printing device according to claim 7, wherein the wireless communication device includes a second wireless communication device configured to perform long-range and high-speed wireless communication as compared with the first wireless communication device, and the relay board includes, as the wireless communication device attachment portion, a second wireless communication device attachment portion to which the second wireless communication device is attached.

9. The printing device according to claim 8, wherein when the first wireless communication device and the second wireless communication device are attached to the relay board, the first wireless communication device and the second wireless communication device do not overlap in a direction from the first side to the second side in the first attachment state.

10. The printing device according to claim 1, wherein the position detection sensor is a capacitive sensor, and the display panel and the touch sensor constitute a capacitive touch panel.

* * * * *